US012511612B2

(12) United States Patent
Altieri

(10) Patent No.: US 12,511,612 B2
(45) Date of Patent: Dec. 30, 2025

(54) METHOD OF SIZING MERCHANDISE IN AN INVENTORY MANAGEMENT SYSTEM

(71) Applicant: Frances Barbaro Altieri, Belmont, MA (US)

(72) Inventor: Frances Barbaro Altieri, Belmont, MA (US)

(*) Notice: Subject to any disclaimer, the term of this patent is extended or adjusted under 35 U.S.C. 154(b) by 1083 days.

(21) Appl. No.: 17/514,514

(22) Filed: Oct. 29, 2021

(65) Prior Publication Data
US 2022/0051180 A1 Feb. 17, 2022

Related U.S. Application Data

(60) Continuation-in-part of application No. 16/397,474, filed on Apr. 29, 2019, now Pat. No. 11,164,145, which is a division of application No. 14/471,589, filed on Aug. 28, 2014, now Pat. No. 10,318,916.

(60) Provisional application No. 61/871,055, filed on Aug. 28, 2013.

(51) Int. Cl.
G06Q 10/00 (2023.01)
B25J 11/00 (2006.01)
G06Q 10/087 (2023.01)

(52) U.S. Cl.
CPC ............ *G06Q 10/087* (2013.01); *B25J 11/00* (2013.01)

(58) Field of Classification Search
CPC ............................... G06Q 10/087; B25J 11/00
See application file for complete search history.

(56) References Cited

U.S. PATENT DOCUMENTS

| | | |
|---|---|---|
| 6,665,577 B2 | 12/2003 | Onyshkevych et al. |
| 6,907,310 B2 | 6/2005 | Gardner et al. |
| 7,020,538 B2 | 3/2006 | Luhnow |
| 7,092,782 B2 | 8/2006 | Lee |
| 7,146,239 B2 | 12/2006 | Loeb |
| 7,398,133 B2 | 7/2008 | Wannier et al. |
| 7,577,583 B2 | 8/2009 | Litke et al. |
| 7,657,341 B2 | 2/2010 | Lind |
| 8,175,931 B2 | 5/2012 | Harvill et al. |
| 8,660,902 B2 | 2/2014 | Coulter |
| 8,700,477 B2 | 4/2014 | Wolper et al. |
| 2009/0193675 A1 | 8/2009 | Sieber |
| 2011/0022965 A1* | 1/2011 | Lawrence ............... G06F 3/011 715/747 |

(Continued)

OTHER PUBLICATIONS

Non-Final Office Action issue in U.S. Appl. No. 14/471,589 on May 17, 2018.

(Continued)

*Primary Examiner* — Rokib Masud
(74) *Attorney, Agent, or Firm* — Edwards Neils LLC; Jean C. Edwards, Esq.

(57) ABSTRACT

The present invention relates to the sizing of merchandise such as clothing, soft goods, and hard goods, including the measurement, tracking, stamping, and security of the merchandise, the managing of an inventory of merchandise, whether at a facility or at a retailer, or in a virtual environment or metaverse over a network or social network. In addition, the present invention encompasses the process of sizing or measurement of the merchandise to the point of sale, as well as the sizing or measurement of a user to locate merchandise that will fit the user, can be accomplished in person or in a virtual environment or metaverse, which provides a real-world experience to the user.

18 Claims, 11 Drawing Sheets

(56) References Cited

U.S. PATENT DOCUMENTS

| | | |
|---|---|---|
| 2011/0078055 A1 | 3/2011 | Faribault et al. |
| 2012/0016518 A1 | 1/2012 | Saario et al. |
| 2014/0176565 A1 | 6/2014 | Adeyoola et al. |
| 2014/0348417 A1* | 11/2014 | Moore ................ H04N 13/282 382/154 |
| 2017/0124547 A1 | 5/2017 | Natarajan et al. |

OTHER PUBLICATIONS

Final Office Action issue in U.S. Appl. No. 14/471,589 on Oct. 9, 2018.
Non-Final Office Action issue in U.S. Appl. No. 16/397,474 on Nov. 13, 2020.

* cited by examiner

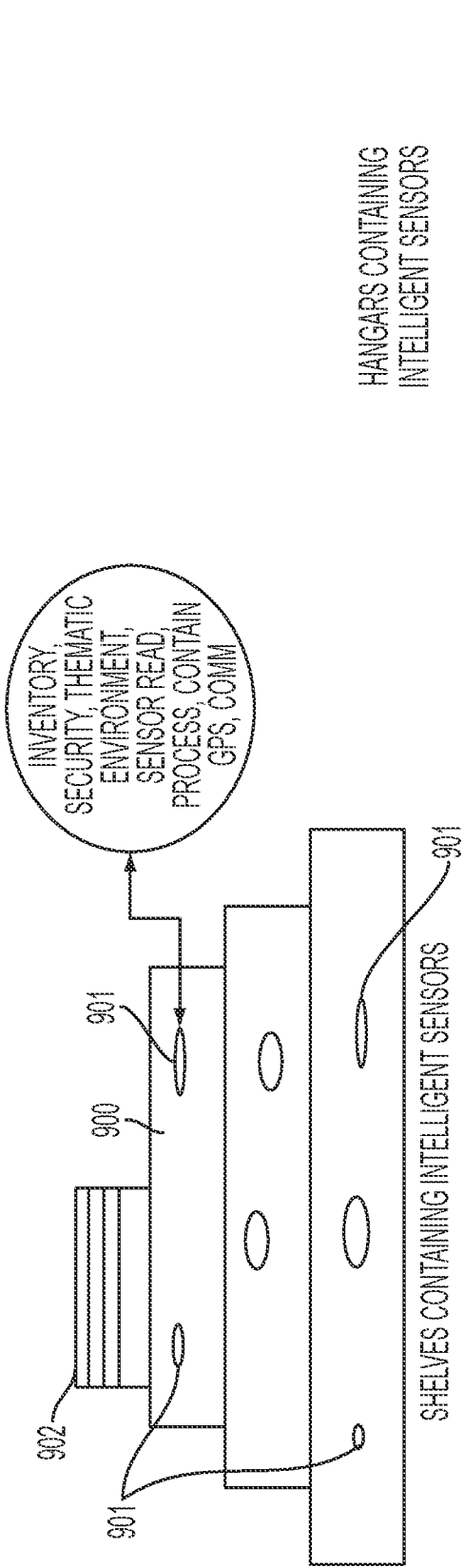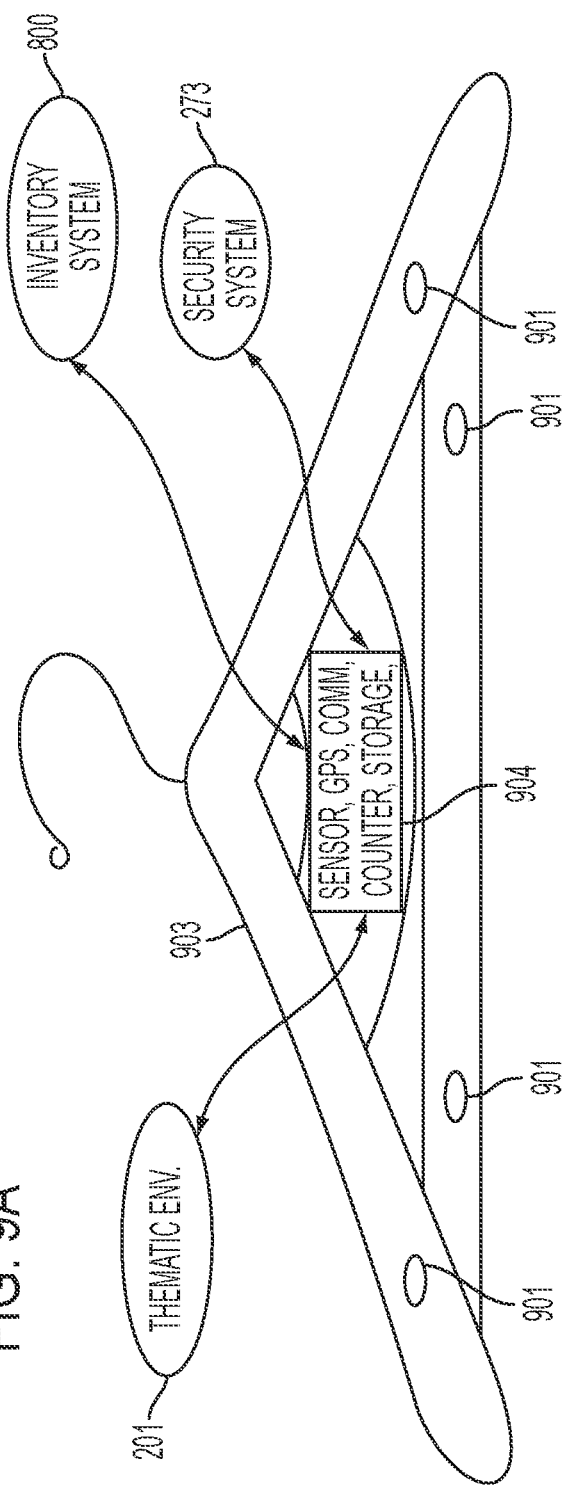

METHOD OF SIZING MERCHANDISE IN AN INVENTORY MANAGEMENT SYSTEM

CROSS-REFERENCE TO RELATED APPLICATIONS

The present application is a Continuation-in-Part of U.S. patent application Ser. No. 16/397,474, filed Apr. 29, 2019, which is a divisional application of U.S. patent application Ser. No. 14/471,589, filed Aug. 28, 2014, which issued on Jun. 11, 2019 as U.S. Pat. No. 10,318,916, which claims the benefit of U.S. Provisional Patent Application No. 61/871,055 filed Aug. 28, 2013, the contents of all of which are herein incorporated by reference in their entirety.

BACKGROUND OF THE INVENTION

1. Field of the Invention

The present invention relates to an electronic apparatus and method for the sizing of merchandise such as clothing, soft goods, and hard goods, and managing the merchandise from the point of manufacturing to the point of sale. The present invention further encompasses the measurement, tracking, stamping, and security of the merchandise, as well as the cutting and sewing of the merchandise, and includes the equipment required to manufacture clothing, footwear, and other types of goods. The present invention also includes managing an inventory of merchandise, whether at a facility (e.g., warehouse, storage unit), or at a retailer (e.g., storefront), or in a virtual environment or metaverse over a network or social network (e.g., virtual closet).

2. Description of Related Art

Virtual environments and three dimensional (3D) rendering of images, clothing, merchandise, are becoming the mainstream. Capturing and rendering the images into 3D have assisted individuals, merchandisers, and manufacturers to populate web sites and virtual environments. It is possible to capture the images and convert them from two dimensional (2D) to 3D; however, sizing objects to the specific individual, especially for those who purchase clothing remain difficult to achieve. Some manufacturers or merchandisers have used patterns for sizing, while others capture the images and calculate the sizes by converting them to 3D, using mathematical algorithms afterwards to interpret the individual sizes. Others allow you to shop from home by using a gaming device, lighting and cameras, which are used to view the merchandise online on the same device.

However, despite these attempts, being able to actually size merchandise from the point of manufacturing has not been accomplished, and thus, being able to size such merchandise, and being able to track and size the merchandise on the person's virtual body using an avatar or hologram and using the exact measurements, as well as shopping for exact measurements from the person's home via a virtual system, environment, closet, business, social network, game, or other application, is desired.

In addition, being able to integrate tracking mechanisms during the manufacturing process for security, inventory tagging, and managing the specifications of that merchandise during and after the manufacturing process in an inventory system, would be an advancement over present technology.

SUMMARY OF THE INVENTION

The present invention relates to an electronic apparatus and method for the sizing of merchandise such as clothing, soft goods, and hard goods, and managing the merchandise from the point of manufacturing (i.e., including cutting and sewing) to the point of sale. The present invention further encompasses the measurement, tracking, stamping, and security of the merchandise, as well as the cutting and sewing of the merchandise, and includes the equipment required to manufacture clothing, footwear, and other types of goods. The present invention also includes managing an inventory of merchandise, whether at a facility (e.g., warehouse, storage unit), or at a retailer (e.g., storefront), or in a virtual environment or metaverse over a network or social network (e.g., virtual closet).

In addition, the present invention is directed to the equipment related to the manufacturing of the merchandise, the process of sizing or measurement of clothing, soft goods and hard goods, as well as the collection, conversion, storage, management of production equipment, communication, rendering/conversion from 2D, 3D, 4D, 5D, video or other format and the management and integration of an inventory system (including a live inventory system) to the point of sale, which can be accomplished in an interactive software application, virtual environment (i.e., virtual closet) or metaverse, social network, commercial and/or game application, catalog, or store, which provides a real world experience to the user.

In one embodiment, the present invention may be used to size merchandise from the point of design to the cutting of the materials, goods, or merchandise. In one embodiment, the present invention tracks the sizing of the merchandise as it is being manufactured by capturing via a scanning or image capturing device such as a camera (i.e., digital camera), a mirror (i.e., with embedded cameras), flat digital mirror/screens, a scanner, a wand, a square box, a digital closet, a stand (with cameras on poles, etc.), a store (with 360 degrees 3D imaging cameras etc.), etc., and submitting the data to an application or system for rendering; storing the information; and merging data for each piece of merchandise to produce the correct size item. Thus, anyone who is designing, and manufacturing goods can manage the goods and merchandise being manufactured, as well as anyone who wants to purchase the goods, now has a system that allows them to try on the merchandise from a virtual environment or metaverse either on a hologram or avatar of themselves or image of the individual they are purchasing the goods.

In one embodiment, the apparatus and method for sizing the merchandise is accomplished on a person's virtual body, avatar, or hologram, or from measurements collected by a measuring device such as an imaging capturing device, to manufacture, and allow the purchase of the goods that will fit the individual's body from the captured person's physical measurements.

In one embodiment, at least one of the scanning and/or image capturing device in or one of the measuring devices encompasses a user's cell phone, remote control, or liquid crystal display (LCD) panel on any display device of a computer, programmable intelligent sensors (i.e., used in clothing, for example), and in manufacturing, can encompass use of a wand, sewing machine, cutting device, blow molding device, embedding device, or any other equipment used in the manufacturing of the merchandise, including clothing, footwear, or any other type of soft goods or hard goods including furniture, home goods, etc.

In one embodiment, the measuring device includes the QIE(OS) engine or module, or the QIE(OS) engine or module can be included in a combination measuring device and embedding device. In one embodiment, the measuring device (i.e., wand) sends information through a communication cable, wireless, or some other type of networking system, to the client, server or both.

In one embodiment, the imaging capturing device, the sewing machine, blow molding device, cutting machine, or other devices used in the present invention, all have a controller, intelligent chip/high powered cray-type of chip or intelligent programmable sensor, that contains a processor having the QIE(OS) engine or module for processing, and a Digital Content library and Data Storage for storing the information gathered. In one embodiment, in addition to the QIE(OS) engine or module and Digital Content Library module, the image capturing device may include an Artificial Intelligence (AI) engine or module, a Thematic Engine or module, and Communication modules/devices to connect to a computer via wireless communication or by ethernet or other cable systems.

In one embodiment, the present invention also includes an apparatus and method for the collection, conversion, storage, tagging, tracking, security, and integration of a live inventory system, to view and track goods for purchase from a virtual closet, mirror, social network, game environment or device, to locate the goods and store location(s), to track the goods via a tracking mechanism. Security and tracking of the goods are performed via a global positioning system (GPS) and/or satellite system, as well as by the use smart devices or other types of security for tracking components of the merchandise as it is being manufactured, including but not limited to a radio frequency identification (RFID) device, metallic thread, metallic inks, specialty inks, conductive inks, labels, threads, barcodes, programmable/intelligent sensors, or other types of smart devices.

In one embodiment, the smart devices provide the user sizing or other information, and may include flexible chips, programmable threads, wearable strain sensors and heaters, conductive yarns/threads/materials, programmable carbon fiber, flexible memory-based fabric, and embedded controllers which may contain a novel Quantum Imaging Environment Operating System (QIE(OS)).

In one embodiment, the QIE(OS) engine or module of the computer/controller of the present invention includes mathematical algorithms for rendering/rasterization of the images, and AI structure (e.g., AI engine) for the support of flexible/bendable technology and power generation. In one embodiment the QIE(OS) engine or module continues to support parallel processing and offloading to blades, high level processing technology chips such as cray chips and devices.

The present invention is also directed to the management of the industrial equipment for failure and production management, capturing the user's image and determining/calculating the user's actual size, and fitting the person's avatar, room etc. with the merchandise for either purchase, production of a catalog or other type of application designed specifically to support the user.

The present invention may be used in merchandising, entertainment, business, publishing, and other applications to provide a virtual and real-world or metaverse experience to the user by integrating audio, video, 2D, 3D, 4D, 5D and other technologies, that may enhance the user's experience. In particular, the QIE(OS) engine or module of the present invention injects real-time data, such as pricing, film, music, news, etc., into a virtual thematic environment and/or metaverse which includes both audio and video, and also integrates mini-applications, such as word processing, banking, spreadsheets, purchasing (i.e., e-commerce applications, and any other type of application that can be scaled or as a demo), e-mail, and the like, into the virtual thematic environment, without a noticeable delay. The present system can be both a rich graphic environment, and may also include a holographic system and technology, mirror imaging technology, and high-level algorithms. The present invention can provide a virtual 2D, 3D, and/or 4D, or 5D, virtual environment and/or metaverse which can include not just audio, music and video, but sensitivity to touch, the sensing of odors etc., so that the user can experience a real-world environment in which the user can move through in real-time in any application, thematic application and/or metaverse.

In one embodiment, a method of providing a user with access to an inventory of merchandise in a plurality of sizes, the method includes: providing a quantum imaging environment operating system (QIE(OS)) module at one of a client or a server, the client or the server containing a data storage which is accessed by said QIE(OS), the data storage being located at at least one of the client or the server or provided as an external data storage, the data storage which stores a design of the merchandise in a digital design file; developing a digital pattern file based on the digital design file using the QIE(OS) module and the artificial intelligence (AI) module; storing the digital pattern file in the data storage using the QIE(OS) module; instructing the cutting device using the QIE(OS) module to cut a material using a cutting device in accordance with the digital pattern file, to form a pattern-cut material; capturing one or more images of the pattern-cut material using an image capturing system and storing the captured images in the data storage using the QIE(OS) module; obtaining cut material measurements of the pattern-cut material from the cutting device using the QIE(OS) module, and storing the cut material measurements in the data storage; embedding a unique identification tag into the pattern-cut material using an embedding device instructed by the QIE(OS) module; associating, using the QIE(OS) module, the captured images, the cut material measurements, and the unique identification tag with one another in the data storage; receiving and storing into the data storage, using the QIE(OS) module, user digital measurements captured by sensors of a body of the user; searching the data storage, using the QIE(OS) module, for the pattern-cut material having the cut material measurements approximating the user digital measurements, using output from the unique identification tag; locating, using the QIE(OS) module, the pattern-cut material using the outputted unique identification tag from the data storage; and manufacturing the merchandise in accordance with the digital pattern file using the located pattern-cut material.

In one embodiment, a method of implementing an inventory management system includes: providing a quantum imaging environment operating system (QIE(OS)) module at one of a client or a server, the client or the server containing a data storage which is accessed by the QIE(OS), the data storage being located at at least one of the client or the server or provided as an external data storage; storing in the data storage, using the QIE(OS) module, a design of an item of merchandise created by a user and a pattern developed from the design; instructing a cutting device, using the QIE(OS) module, to cut a material into the pattern based on the design created by the user; capturing images of the material using at least one scanning and/or image capturing device, as the material is cut into the pattern by the cutting device, to form a piece of merchandise; storing, using the QIE(OS) module, the captured images of the cut material in the data storage; analyzing the captured images using the QIE(OS) module and an AI module, for pattern information and measurements; sending the captured images, pattern information and measurements, using the QIE(OS) module and a Communications module, to a manufacturing system for manufacture and processing; manufacturing the piece of merchandise according to the pattern information and the measurements; embedding a unique identification into the merchandise using an embedding device instructed by the QIE(OS) module, during manufacturing and processing; capturing images of the processed piece of merchandise with the embedded unique identification using the scanning and/or image capturing system; tagging the processed piece of merchandise using a tagging system instructed by the QIE(OS) module, for tracking in the inventory management system.

In one embodiment, the method of the present invention further includes: utilizing a robotic arm to pick up each piece of merchandise and place each piece of merchandise on a conveyor belt, based on instructions from the QIE(OS) module; scanning, using a measuring wand, the merchandise, and collecting information on the merchandise using the QIE(OS) module, the AI module and a Digital Content Library module, including measurements of the merchandise and the embedded unique identification; and moving the merchandise to a container using another robotic arm, based on instructions from the QIE(OS) module, after the embedding device embeds the unique identification.

In one embodiment, the embedding device includes at least one of an RFID chip embedding device, an ink embedding device, a label device, a barcode embedding device, a sensor embedding device, or a specialty thread embedding device.

In one embodiment, when the merchandise is soft goods, the method further includes flattening the merchandise using a puffing device, a vent, or a blower.

In one embodiment, managing the merchandise using the QIE(OS) module, the AI module, and a Digital Content Library module, includes at least one of a ticket creation system for the merchandise, a mark up/down system for the merchandise, a barter system of the merchandise for customers, a polling system to check inventory, an auction system for the merchandise, a retail training application merchandising system, a security system for the merchandise, or a billing system for the merchandise.

In one embodiment, a method of sizing merchandise for a person, includes: providing a quantum imaging environment operating system (QIE(OS)) module at one of a client or a server, the client or the server containing a data storage which is accessed by the QIE(OS), the data storage being located at at least one of the client or the server or provided as an external data storage; providing a measuring device which captures measurements of one or more parts of a body of a person for sizing merchandise for the person; transmitting the measurements using a Communications module of an electronic device to a Thematic module and the QIE(OS) module; wherein the Thematic module and the QIE(OS) module determine where the measurements are sent for processing, including but not limited to an enterprise resource planning system (ERP), a designer, or a store; and storing the measurements in the data storage.

In one embodiment, the measurement device is an article of clothing including but not limited to a piece of footwear or foot covering, a piece of clothing that covers one of at least an upper body, a lower body, or extremities, and which molds to the body of the person.

In one embodiment, the article of clothing includes at least one of a conductive yarn, or a memory-based fiber that contains an identification including at least one of a specialty threaded sensor or thread, a label, a conductive ink, bar code, a fiber optic thread, or a programmable sensor.

In one embodiment, the article of clothing includes at least one of a stretchable or bendable battery, a controller containing said QIE(OS) module, or a temperature measurement mechanism.

In one embodiment, the measuring device is a tube having at least one image capturing device disposed overhead on a rotating belt or track that takes an image of the person to obtain the measurements for sizing.

In one embodiment, the measuring system is a portable device containing a controller that implements the QIE(OS) module, and at least one of a Thematic Engine module, an AI module, or a Digital Content Library module.

In one embodiment, measuring the system is a portable device having an image capturing system connected via a rod or pole, which measures the body of the person as the person rotates and moves around the portable device.

In one embodiment, the image capturing device includes a controller board containing the QIE (OS) module, and/or connects to at least one of a black box, an IPAD, or a computer, via a communication device.

In one embodiment, the measuring device is one of a scanner, a wand, a technical box, a virtual closer or a mirror having embedded image capturing devices, a digital screen, or a stand with one or more image capturing devices.

In one embodiment, the QIE(OS) module calculates and maintains in the data storage and/or the Digital Content Library module, all the measurements of the person.

In one embodiment, the method of the present invention further includes embedding, using an embedding device instructed by the QIE(OS) module, the measurements from the measuring device into an identification including at least one of a specialty threaded sensor or thread, a label, a conductive ink, bar code, a fiber optic thread, or a programmable sensor, for one of sizing of the person, or security and/or tracking of the merchandise.

In one embodiment, the sizing of the person is conducted in at least one of a virtual environment or metaverse, a store, a business, or a social network, or from at least one of a virtual closet, a computer environment, or a cell phone; and wherein the person is one of a physical body or an avatar.

In one embodiment, the merchandise is displayed as a plurality of digital images or data, in a real world, in a virtual world or metaverse or a combination thereof, using a Graphical User Interface (GUI) module; and the user is provided, using the QIE(OS) module, a Thematic Engine module and a Digital Content Library module, with a location or Zone of the merchandise or the store or business, from a GPS or a satellite, and the location or Zone is a physical location of one of a rack, a shelf, a hangar, a case, or a closet in one of the store, the business, an address, or a location in a home.

In one embodiment, the user creates the avatar by capturing an image of the body of the user using an image capturing device.

In one embodiment, the image capturing is performed from all angles of the body of the user, and the QIE(OS) module converts the image into measurements of a real-life avatar or an existing avatar stored in the inventory system to which the measurements are mapped.

In one embodiment, at least the QIE(OS) module or the QIE(OS) module, the Thematic Engine module and the Digital Content Library module, calculates a size of the avatar from the measurements taken by the image capturing device of the body of the user.

In one embodiment, the measurements of the size of the avatar are stored in a data storage of the inventory system.

In one embodiment, the user is provided with a hologram of the user from an input device, based on the measurements from the image capturing device, and the QIE(OS) module maps the merchandise over the hologram of the user to locate and/or obtain the size of the merchandise, and displays the sized merchandise to the user on a display device.

In one embodiment, the input device which provides the hologram is one of a hand-held device, wand, command device, brain/mind control system, eyeglass, watch, or virtual closet.

In one embodiment, the merchandise can be located from manufacturing process to inventory storage.

In one embodiment, the measurements are mapped to clothing in one of a personal closet or drawer at a home of the user using said QIE(OS) module, and a catalog of images of the clothing from a data storage of the user, and a location of the clothing at the home of the user, is provided to the user using the QIE(OS) module and the Thematic Engine module, via the input device.

In one embodiment, the clothing is located by the QIE (OS) module via a GPS system and/or satellite system, or other location signal of an outputted identification tag.

In one embodiment, the user can forward the measurements or avatar using the QIE(OS) module and the Thematic Engine module, via a communications module, to a designer or manufacturer to create a specific pattern with exact measurements for merchandise on demand, with a tracking or security system included in the merchandise.

In one embodiment, the user is provided by the QIE(OS) module and AI engine module with a personal online catalog of merchandise specifically populated with inventory suitable for the user, for view and for purchase.

In one embodiment, the user is allowed access to the inventory management system for real-time location of merchandise, and purchases are processed through the Thematic Engine module, the inventory system Digital Content Library module, and/or the QIE(OS) module.

In one embodiment, images of the merchandise are accessed from the data storage in a form of at least 2D, 3D, 4D, (non-augmented motion), 5D, or video.

Thus, has been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 9A is a schematic diagram of an electronic shelf, and FIG. 9B is a schematic diagram of an electronic hangar, both containing intelligent sensors, for capturing and displaying sizing and other information, according to the embodiment consistent with the present invention.

DESCRIPTION OF THE INVENTION

The present invention relates to an electronic apparatus and method for the sizing of merchandise such as clothing, soft goods, and hard goods, and managing the merchandise from the point of manufacturing (i.e., including cutting and sewing) to the point of sale. The present invention further encompasses the measurement, tracking, stamping, and security of the merchandise, as well as the cutting and sewing of the merchandise, and includes the equipment required to manufacture clothing, footwear, and other types of goods. The present invention also includes managing an inventory of merchandise, whether at a facility (e.g., warehouse, storage unit), or at a retailer (e.g., storefront), or in a virtual environment over a network or social network (e.g., virtual closet).

In addition, the present invention is directed to the equipment related to the manufacturing of the merchandise, the process of sizing or measurement of clothing, soft goods and hard goods, as well as the collection, conversion, storage, management of production equipment, communication, rendering/conversion from 2D, 3D, 4D, 5D, video or other format and the management and integration of an inventory system (including a live inventory system) to the point of sale, which can be accomplished in an interactive software application, virtual environment or metaverse (i.e., virtual closet), social network, commercial and/or game application, catalog, or store, which provides a real world experience to the user.

The present application additionally incorporates by reference in their entirety, the present inventor's U.S. Pat. Nos. 8,458,028, 7,373,377, 8,228,325, 8,225,220, 9,225,880, 10,255,724, 10,846,941, and 10,991,165, as well as U.S. patent application Ser. No. 15/348,438, filed Nov. 16, 2016, and Ser. No. 15/817,815, filed Nov. 20, 2017.

Physical Architecture

Figure 1:
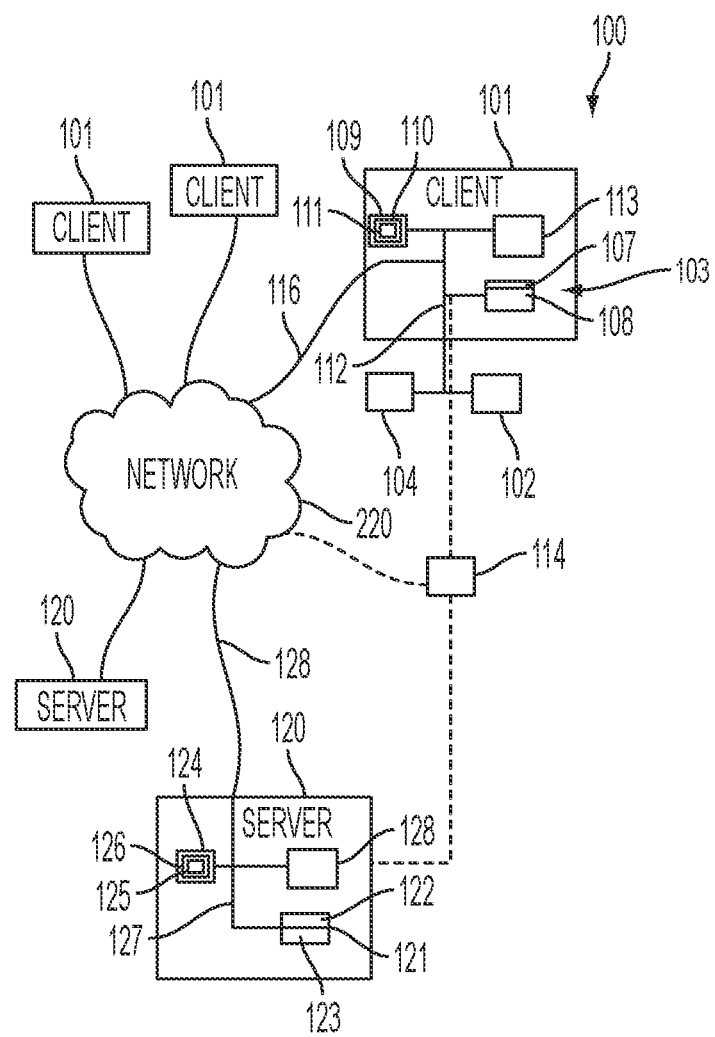
FIG. 1 is a schematic drawing of the client-server environment, according to one embodiment consistent with the present invention.

A typical layout of a client-server system that is used in one embodiment of the present invention is shown in FIG. 1 and described in detail in incorporated patent applications/patents. The system 100 may include a client computer 101—i.e., a personal computer (PC), a mobile terminal, such as a mobile computing device, a mobile phone, or a mobile data organizer (i.e., personal data assistant (PDA)), or any other digital device that has a display screen and database storage. The client computer 101 typically includes a processor 106 which has a central processing unit (CPU) 107 and an input/output (I/O) interface 108, a memory 109 with a software program 110 having a data structure 111, all connected by a bus 112, as well as an input device 104 or means, a display 102, and in some instances a secondary storage device 113. The processor 106 executes a program 110 adapted to predetermined or programmed operations. The processor 106 has access to the memory 109, in which may be stored at least one sequence of code instructions comprising the program 110 and the data structure 111 for performing predetermined or programmed operations. The memory 109 and program 110 may be located within the client 101 or external thereto in an external data storage 114.

The program 110 can include a separate program code for performing a desired operation, or the operations of the present invention may be carried out by a plurality of modules, the modules which perform unique functions of the invention, such as those described below. In one embodiment, the modules may perform sub-operations of an operation, or may be part of a single module of a larger operation.

The program 110 of the present invention is loaded onto client 101 or server 120 systems that have applications and/or disk drives. For those systems 101, 120 that do not have the applications or disk drives, a small electronic device 104 would include a program 110 that collects the information from the intelligent sensors of the equipment 1606 processes and displays the information, and/or transmits the information via wireless communications, satellite transmission or direct connection to a server 120 and or QIE(OS) engine 203, that processes the information. The information is then communicated by the program 110 via email, text, phone, dashboard, image to the operator of the equipment 1606, or the user.

The data storage device 113, 114 may be a database 113, 114, including a distributed database 114 connected via a network, and may be connected to the server 120 and/or the client 101, either directly or through a communication network, such as the internet. Data may also be received via a network 220 or the internet and directly processed.

Input means 104 at the client 101 include "hot clickable" icons etc., selection buttons, in a menu, dialog box, or a roll-down window of an interface, as well as a keyboard, pen, stylus, mouse, speech processing device or means, touch screen, or other input/selection devices or means 104.

The client 101 is connected to other clients 101 or servers 120 via a communication link 116 and may include wireless service connection. The server(s) 120 includes a processor 121 having a CPU 122 and an I/O interface 123, but may also include a distributed CPU including a plurality of individual processors 121 on one or a plurality of machines. The server 120 would also include a memory 124 with program 125 having a data structure 126 all connected by a bus 127. The server processor 121 may have access to a storage device 128 for storing large numbers of programs 110 for providing various operations to the users, as well as the external storage 114. The server 120 may be a single unit or may be a distributed system of a plurality of servers 120 or data processing units, and may be shared by multiple users in direct or indirect connection to each other. The server 120 performs at least one server program 125 for a desired operation, which is required in serving a request from the client 101. The communication link 128 from the server 120 may be preferably adapted to communicate with a plurality of clients 101.

In one embodiment, the server system 120 and/or the client system 101 may access directly a number of systems (see FIG. 2), or may utilize communications 514 with network/security features, which allows connection to those systems via a wireless service connection 515 over the internet. These systems may include, for example, a satellite system 210, voice recognition system 207, business intelligence system 320, language translation service 208, global positioning system (GPS) 212, enterprise resource planning system (ERP) 400, cutting device or pattern system 272, or security system 273. However, one of ordinary skill in the art would know that other systems may be included, such as an auction system 211, weather system 214, and smell system 215 (which outputs odors such as smells for perfume, for example).

Although the physical architecture of the present invention described herein has been described as client-side or server-side components, one of ordinary skill in the art would know that the herein-described components of the physical architecture may be in either client 101 or server 120, or in a distributed environment.

Further, although the features and processing operations described herein may be realized by dedicated hardware, they may also be realized as programs including code instructions executed on data processing units. Further, parts of the above sequence of operations may be carried out in hardware, whereas other of the above processing operations are carried out using software.

Software operations of the present invention are implemented in the client 101, client 101 and server 120 environment (see FIG. 2), or in a distributed system (across a number of client systems, 101, for example) over a computerized network 220, or embedded in a controller that activates both the computer system 101, 120 and/or other devices. Thus, in the present invention, a particular operation may be performed either at the client 101 or the server 120, at the edge of a network 220 or at the center, or both.

Therefore, at either the client 101 or the server 120, or both, corresponding programs for a desired operation/service are available.

In one embodiment, the virtual platform of the present invention includes a number of modules and/or programs, including, but not limited to a graphical user interface (GUI) 200 (see FIG. 3), a Quantum Imaging Environment (QIE) Operating System (OS) 203, a Thematic Engine 201, a Digital Content Library 270, an Accounting/Billing system 202, and a Data Storage 205—all shown in a client-server arrangement, but could also be provided in a distributed environment.

Figure 2:
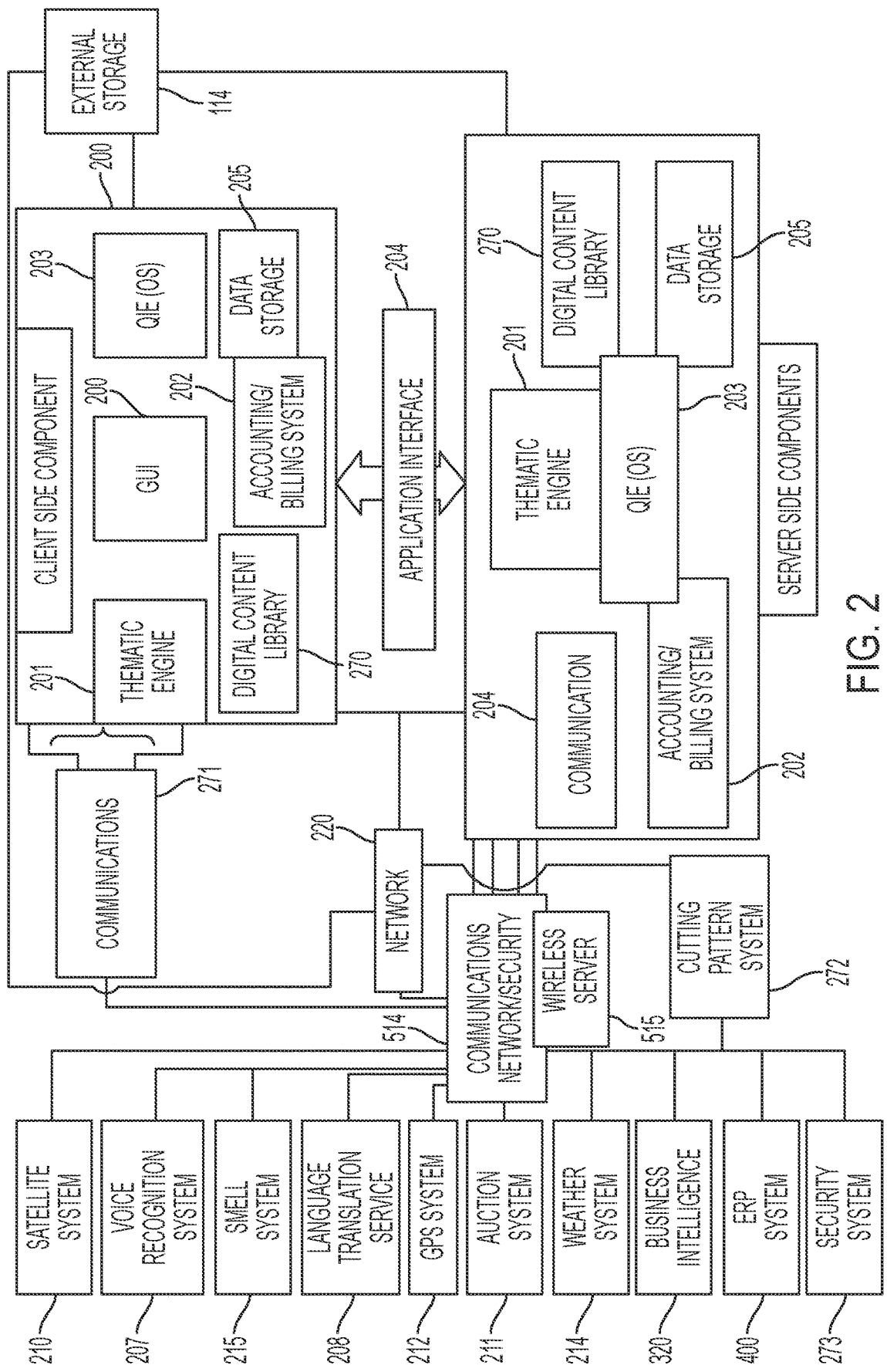
FIG. 2 is a schematic drawing of client-side server components, according to one embodiment consistent with the present invention.

In one embodiment, in a client-server system, the client system 101 interacts with the server system 120 via an Application Interface 204 (see FIG. 2). The modules such as the QIE(OS) 203, Thematic Engine 201, Digital Content Library 270, Data Storage 205, Accounting/Billing Systems 202, and Communications links 271/204 can have operations residing in either client 101 or server 120 or both.

In one embodiment, the QIE(OS) 203 interacts with the Accounting/Billing system 202, Data Storage 205 and Communications 204, as well as the Digital Content Library 270 of the Thematic Engine 201.

In one embodiment, the QIE(OS) 203 of the present invention pertains to the most common denominator—the application architecture, and the content. In one embodiment, the QIE(OS) 203 is a unique operating system which includes an interpreter that allows data to be transmitted to any device and is the basis for the design structure and layout for applications. In one embodiment, the QIE(OS) 203 is an interpreter (includes artificial intelligence) that will take all of the rich content, interpret the information into objects to be manipulated and accessed via any device and place these objects or information in the appropriate format that is designed or will be designed by the developer. In one embodiment, the novel QIE(OS) 203 allows developers to develop objects and applications from the interpreter for virtual environments (i.e., retail, gaming, auction, or other thematic environments or metaverses), where the representation of the layout and design may be in the representation of "zones", and the layout and design may be set up as zones and content, for retail, educational purposes, etc. In one embodiment, the QIE(OS) 203 can manipulate data in object form or some other form that would be accessed, manipulated and interpreted on any digital device.

In one embodiment, the QIE(OS) 203 engine, manages different types of input: 2D, 3D, Holographic, Video, Voice, and other types of input processing of information, and outputs the data into different formats converting the images from the input types to different input or 2D, 3D 4D Augmented motion, 4D (non-motion), Holographic, 5D and other formats.

In one embodiment, the QIE(OS) 203 of the present invention exposes the user to 4D augmented motion system created by controllers and or programmable intelligent sensors built into tables, walls, floors, or other physical matter, taking its instructions from the Thematic Engine 201 and providing the sensation of movement of chairs, cars, elevators, trains, escalators, and other types of movement.

In one embodiment, if the input device or client 101 is a camera, depending upon the lenses of the camera, the resolution of the images captured can be finer for rasterization/rendering. In one embodiment, the use of layering of the images, polynomials, factorials and other mathematical formula are used to manipulate/render/rasterize the actual dots/bits that make up the images allowing these images to be created and saved into other formats via a mini application that is part of the QIE(OS) engine 203, which are required for different types of internet applications and environments and required to render/rasterize the image. In one embodiment, the output of data can be stored to or viewed by different devices, including, but not limited to computer screens, holographic globes, cell phones, personal digital assistants (PDAs), any type of black box, digital device, programmable intelligent sensor, projection device, server, satellite, computer or virtual environment, including over the WWW and or the Internet.

In one embodiment, the QIE(OS) 203 engine is located on a main computer client-server system (see FIG. 2) working over the internet 220, intranet, cloud, etc. (via communication link 271) with other modules (e.g., Thematic Engine 201 on the client-side and/or Accounting/Billing system 202 on the server-side), or to external systems (i.e., satellite system 210). In one embodiment, the QIE(OS) 203 engine 203 includes an arithmetic processor or high-level processing chip that can process different levels of algorithms such as fractals, polynomials, linear based calculations, etc., and communicates with a data storage 205, and the Thematic Engine 201 which includes an artificial intelligence (AI engine) 257 (see FIG. 3). In one embodiment, the QIE(OS) 203 collects content from the real world (i.e., content from the vendor's websites, information on time, weather, late-breaking news, etc.) and injects this content into the thematic virtual world or metaverse through the Thematic Engine 201.

In one embodiment, the QIE(OS) 203 system may be designed around Open Source technologies but may include custom software developed in an open standards environment. By using Open Source and proprietary technologies with generic APIs, the present invention is scalable as the numbers of users increase, and the advances can be programmed as Open Source technologies.

In one embodiment, FIG. 2 shows the GUI 200, which is a lightweight client application written to run on existing computer operating systems which may be ported to other personal computer (PC) software, personal digital assistants (PDAs), and cell phones, and any other digital device that has a screen or visual component and appropriate storage capability. In one embodiment, the GUI 200 contains an engine for providing graphic hardware capabilities, graphic memory and structures, controls graphic object rendering on hardware, creates/manipulates 2D and/or 3D objects, video objects, streaming video, web objects, lines, rectangles, spheres, vectors, matrices, etc., manipulates animation, colors, bitmaps, textures, images, defines coordinate system and defines world boundaries, defines frames, bounding boxes, camera angles and views, lighting and shadowing etc., provides plug-in extensions, user input stream, event triggers, error handling, management of voice, music, and other graphic and voice formats, voice recognition, and translation services drivers, for example.

In one embodiment, the GUI 200 engine pours in real world content rendered in HTML, XML, RDF, and/or QIE (OS) 203—rendering format or any content format. In one embodiment, the user interacts completely with the GUI 200, beginning with login into the virtual environment, in user help, etc. In one embodiment, the GUI 200 also interacts or connects to the Thematic Engine 201 and an object-oriented database management system (ODDBM), and/or content management system. In one embodiment, the GUI 200 also has all the data related to the user's manipulation of the selection device 104 or means, including any keyboard strokes, use of a pen, joystick, interactive goggles, touch screen, or any other interactive hardware component that would allow the user the ability to move objects, people, etc.

In one embodiment, the Thematic Engine 201 (see FIG. 2) is accessed through the GUI 200 and contains the environmental game rules. In one embodiment, the Thematic Engine 201 is the director of all client-server components by working with a pre-defined (but modifiable) set of rules and events from objects and coordinates further actions to be taken as to what will constitute the thematic environment or metaverse. In particular, the Thematic Engine 201 initializes global memory structures, validation of thematic objects and engines, startup procedures for all engines, collects objects for all engines, initializes the default thematic environment, provides user information, interacts and validates the engines' status, provides access and execution to thematic environment rules, controls and creates events from engines, provides state change to all engines, provides scripting language for explicit object modification, and provides shutdown for all engines, among other actions.

In one embodiment, the Thematic Engine 201 includes all the libraries that are needed for the interactive components of the applications such as animation, graphics, artwork, overall content, web content, and utilizes the services of translation, currency, satellite transmission, video, music, and voice-over libraries, for example. In one embodiment, the Thematic Engine 201 contains the profile of the active users, their current states, individual histories, associations between other active users when in a game format (i.e., team members), and associations within the virtual world, such as with non-game characters.

In one embodiment, the Thematic Engine 201 is designed for vendors in order to incorporate merchandise placement, video feeds, and mini-applications, web sites, e-commerce, music, voice, smell, and GPS system information etc. (i.e., from systems 215, 212, etc.) into the virtual world. In one embodiment, the Thematic Engine 201 may also be used for the development of mini-applications that are dictated by the vendor and will allow a developer to build a simulated e-mail, spreadsheet, database, and any type of application that is vendor-based or pertains to the overall thematic application.

In one embodiment, the Thematic Engine 201 also interfaces directly with other modules, such as e-mail or chat systems 327 (see FIG. 3) and other communications applications 271 that are necessary to the thematic applications or which may be used directly in the thematic applications.

In one embodiment, the Thematic Engine 201 will also interface directly with the Accounting/Billing system 202 for calculating the time, rewards, points, order, purchase, billing and shipping components, etc. As the Thematic Engine 201 needs information, in one embodiment, the Thematic Engine 201 will pull that data from the Accounting/billing system 202 and the Digital Content library 270, or the reverse, depending upon the needs of the application environment. In a gaming environment, for example, the Thematic Engine 201 may be programmed to "grab" data/objects to be utilized in the application/game. Any objects may also be "copied and grabbed" by maintaining the original information of the data or objects and will allow the use of that image, while maintaining the data and integrity of the object, within the application.

In one embodiment, the Thematic Engine 201 will accept still images and/or video feed that contains images, fashion shows, concerts, instructions, and other information that is being used within the game and or real-life application. The still images and/or video feed will be transmitted through the Thematic Engine 201 for processing. In one embodiment, the Thematic Engine 201 will either incorporate the still images and/or video feed directly into the application/game zone, store it in the Digital Content Library 270 or a temporary location for further instruction and processing. If the images are not in the correct format, they will be transmitted to the QIE(OS) 203 engine for further processing and rendering.

In one embodiment, the format of the video can be either in a singular format or if multiple images and/or videos are to be viewed, may be shaped in any way, for example, a carousel, pyramid, square, or some type of form designed by the game designer that will display each image to be selected by the user for viewing. In one embodiment, the user will have the option of viewing, purchasing or "clicking" on or off the image to go to the next area of interest. In one embodiment, the user also has the option of exiting the game or (real-life) application to an external web site dedicated to the vendor for further information as well as purchasing additional goods or services. Upon completion, the user will be returned back to the application/game to continue from the point that they exited.

In one embodiment, the Thematic Engine 201 may store all thematic content required in the virtual environment or metaverse in the Digital Content Library 270 or Data Storage 205. Objects may include video, audio, images, rule sets and default values for all objects used in the thematic environment.

In one embodiment, the Thematic Engine 201 also interacts directly with the Data Storage 205, obtaining and updating information (i.e., states, profiles and history) on the active users. In one embodiment, the Thematic Engine 201 interfaces with the Digital Content Library 270 and passes information back and forth to the specific subfolders and document management system.

In one embodiment, the Thematic Engine 201 may be written in C, C++, C#, Java, Python™, Curl™, and/or Assembler, or any another language that is suited for this type of interaction and/or libraries.

Figure 3:
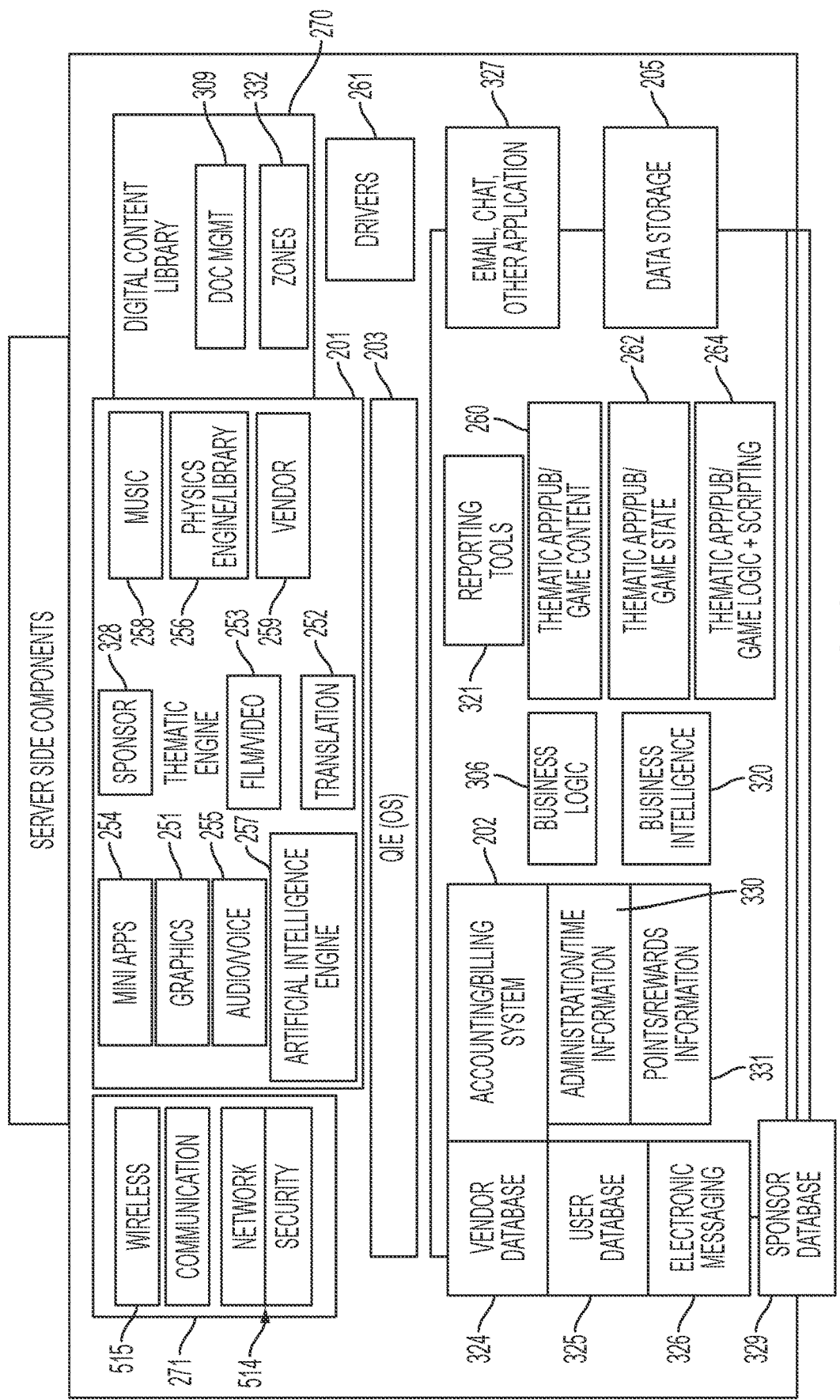
FIG. 3 is a schematic diagram of server-side components, according to one embodiment consistent with the present invention.

In one embodiment, the Digital Content Library 270 (see FIG. 3) is managed by the QIE(OS) 203 engine. In one embodiment, the Digital Content Library 270 is a content management application or database 270 that will be laid out into sections or subsets and its own respective groups similar to a filing cabinet (i.e., document management system 309 as shown in FIG. 3).

In one embodiment, the Digital Content library 270 includes all information such as data, codes, binary files, web content, event notification, and other information. In one embodiment, the Digital Content library 270 may also include scheduling directions for when the web site access and identification of where to place the web content or advertising, e-commerce, video, etc. are to be placed.

In one embodiment, the Digital Content Library also contains Data Zones 332 which are laid out in sections and subsets as well, including for example, Zone 1: USA, Zone 1A: New York, Zone 1A1: New York City, etc.). Within each zone are a subset of data and another subset of data. Each will include, for example, the layout of the streets, buildings, stores, historic locations, rivers, streams, oceans, etc. It will also include the video, music, GPS information, and images relating to each city.

In one embodiment, the Accounting/Billing system 202 or module is tied into the Thematic Engine 201 and the Data Storage 205 modules by the QIE(OS) 203. In one embodiment, the Accounting/Billing system 202, as well as the QIE(OS) 203 (see FIG. 2), maintain the profiles of the active users, their current states, individual histories, associations between active users (i.e., team members), and associations with non-users (i.e., characters within the thematic virtual world). In one embodiment, the Accounting/Billing system 202 interacts with the Thematic Engine 201 as well as the other layers on an as-needed basis to update the profiling for the thematic applications and/or metaverses, as well as information needed for business intelligence reporting. In one embodiment, the Accounting/billing system 202 includes intelligent agents for the following: e-commerce, procurement, catalogs, storefronts, auction, configuration, financial—billing and shipping, connecting to the services etc.

In one embodiment, the Accounting/Billing system 202 includes the rule-based component of business processes for e-commerce, such as advertising, billing, profiling, etc., and integrates easily with all the networked components, libraries, QIE(OS) 203, and business intelligence. In one embodiment, the rules are developed using Java, C, C++, Python™, Curl™, or any other suitable programming language. It includes XML, HTML or any markup language or other method for communication to connect and communicate with the internet and it will be extensible.

In one embodiment, the Accounting/billing system 202 handles the translation of rules to and from heterogeneous commercially important rule systems/languages, as well as to and from the existing components and external services performing actions and testing conditions, and maintains the status of the entire QIE(OS) 203 environment and keeps its services supported.

In one embodiment, the Accounting/Billing system 202 interfaces with the Data Storage 205 to update information on the active users, determining what information is relevant today vs. yesterday. In one embodiment, the Accounting/Billing system 202 interfaces with the Thematic Engine 201 and then the Data Zones 332 of the Digital Content Library 270, as well as the application builder and interpreter QIE(OS) engine 203.

In one embodiment, the logical architecture of the present invention is designed to provide future consideration for APIs at the Thematic Engine 201 and Accounting/Billing system 202 components. Using software development kits (SDKs), corporate sponsors using professional services, are able to make customer modifications to the thematic application or game.

In one embodiment, the Data Storage 205 (see FIG. 2) includes distributed databases containing all relevant information on the active user's profile in their current state, history, and real-world content. In one embodiment, the Data Storage 205 interacts directly with the Thematic Engine 201 and the Accounting/Billing system 202. The database tables will be distributed using an appropriate database application that will support grid-based logical architecture or other appropriate database architecture.

In one embodiment, the Data Storage device 205 may include a database, such as a centralized database and/or a distributed database (i.e., external storage 114) that are connected via a network 220. In one embodiment, the databases may be computer searchable databases. In one embodiment, the databases may be relational databases. In one embodiment, the databases may be object-oriented databases. In one embodiment, the Data Storage module 205 may be coupled to the server 120 and/or the client computer 101, either directly or indirectly through a communication network 220, such as a LAN, WAN, and/or other networks. In one embodiment, the Data Storage device 205 may be internal (i.e., internal storage device 113 in FIG. 1), or an external Data Storage device 114. According to one embodiment of the invention, data may be received via the network 220 and directly processed.

In one embodiment, Communications 271 of the client system, can manage a multiplayer network and uses standard internet communications that interface with existing libraries or with custom modifications. In one embodiment, the client Communications 271 interface (see FIG. 2) provides access to various network services (i.e., network 220) required to interact with other users (such as a messaging service, system administration service, user/group administration service, chat service, thematic state tracking, and character profile service), and controls dynamic features as applied by the central servers. In one embodiment, the client Communications 271 may provide alternate connection options, and controls termination of the connections.

In one embodiment, the server Communications 204 (see FIG. 2) provides security functions such as user authentication and anti-cheat, anti-theft algorithms, and may also provide methods for secure billing and rewarding systems to users with audit functions. Security is maintained within the virtual environment to ensure that users adhere to virtual world rules. In one embodiment, the server Communications 204 prevents hackers from accessing, modifying, or corrupting data (i.e., modifying their current state and history or the data of others), thus preventing sabotage for the active user population.

In one embodiment, security is also incorporated using encryption between the Accounting/Billing system 202 and the vendors to ensure that there is no back-door entry into the vendors' websites, nor proprietary consumer data is intercepted.

In one embodiment, the server Communications 204 also provides access to various network services (i.e., network 220), to interface with Communications/Network Security module 514 in order to obtain data from systems, such as satellite system 210 etc., which is processed by the QIE(OS) 203.

In one embodiment, the Communications Network/Security interface 514 (see FIG. 2), addresses the security of the logical architecture at two levels—namely, 1) the integrity of the active user is maintained, and 2) secure interaction between the system of the present invention and the vendor is maintained. In one embodiment, the Communications Network interface 514 provides access to various network services (i.e., via wireless 515) required to interact with other users and control dynamic features as applied by the central servers. In one embodiment, the Communications Network interface 514 may include maintaining the state of the thematic environment amongst various users, providing anti-cheating and anti-theft mechanisms, providing messaging services between users, and passes information to and from the client 101 applications and other internal server 120 side applications.

In one embodiment, the Communications Networking Interface 514 provides access to various network services required to support the server 120, such as a messaging framework, etc., and includes maintaining the server component framework. In one embodiment, the Communications Networking Interface 514 is responsible for extracting in real-time, real-world information and normalizing it for the thematic environment. In one embodiment, data sources may consist of XML, SOAP, HTML, FTP, Telnet, or any other commonly available method of data transfer. In one embodiment, normalized rule sets are sent to the server Thematic Application/Publishing/Game Logic and Scripting component 260 for implementation in the thematic environment. The real-world Communications Networking Interface 514 is also responsible for maintaining rules that affect the thematic environment when no other real-world data is available.

In one embodiment, the Communications Network interface 514 may require interaction with the server Accounting/Billing system 202. In one embodiment, the server Communications interface 204 may also require access to other client software during use, and direct access to various databases' information for performance reasons.

FIG. 3 provides more detail on the present invention with respect to the components of the present invention as shown in FIG. 2.

In one embodiment, the Thematic Engine 200 includes a plurality of libraries (see FIG. 3), including a graphics library 251, an audio/voice library 255, a music library 258, a vendor library 259, a sponsor library 328, a translation library 252, film/video library 253, a mini applications library 254, and includes an artificial intelligence (AI) engine 257 and a physics engine/library 256.

With respect to the Thematic Engine 201, in one embodiment, the translation library 252, the film/video library 253, mini applications library 254, and voice library 255, are all related to the engines and/or services associated with the libraries that support both a client 101, such as a client-server, or server-based 120 model. Thus, operations of the present invention can be run from a client, 101 only, which can be connected to a server 120 via the QIE(OS) 203.

In one embodiment, the Thematic Engine 201 interfaces via the QIE (OS) 203 with server-side components such as the Accounting/Billing module 202, the Business Logic module 306, Business Intelligence module 320, Reporting Tools 321, the Thematic Application/Publishing (App/Pub) Game Content module 260, Thematic App/Pub Game State module 262, and Thematic App/Pub Game Logic and Scripting 264.

In one embodiment, a Graphics library 251 is a program library designed to aid in rendering computer graphics to the display 102, by providing optimized versions of functions that handle common rendering tasks. This can be done purely in software and running on the CPU 107, common in embedded systems, or being hardware accelerated by a graphics processing unit (GPU), more common in personal computers (PCs). By employing these functions, the program 110 can assemble an image to be output to a display 102.

In one embodiment, the Physics engine of the Physics component/library (hereafter, "Physics engine 256") controls the behavior of objects as they would be affected by various laws of nature. In one embodiment, the Physics engine 256 provides mathematical manipulation to objects as to how they would react to gravity, rapid deceleration, and chaotic behaviors. In one embodiment, the Physics engine 256 may inform the Thematic Application/Publishing/Game Logic & Scripting component 264 when the object should be changed given the current set of physics logic. In one embodiment, the Physics engine component/library 256 may interact directly with the Thematic Application/Publishing/Game Logic & Scripting component 264.

In one embodiment, the Physics engine 256 controls releasing memory, relates physics objects to game objects, provides physics object duplication, maintains the physics object state, and provides data on object modification due to equations and the Thematic Application/Publishing/Game Logic & Scripting component 264. In one embodiment, the Physics engine 256 disables the local physics code when in multi-user mode and assumes those tasks. The Physics engine 256 may interact directly with the Thematic Application/Publishing/Game Logic & Scripting component 264 for all networked users, and also may rely on a real-time thematic database for partial and context information.

In one embodiment, the Translation library 252 will include program code that will allow the translation of one language into a different language—for example, Spanish to English. In one embodiment, the information or data of the translations will be stored or can be located in the Thematic Application/Publishing/Game Content library 260.

In one embodiment, the Film/Video library 253 includes a program that will allow the present invention to re-create and maintain the attributes of a number of film strips or video in its appropriate format using the appropriate code or language(s). In one embodiment, the Film/Video library 253 may interact with the GUI 200 and Vendor Library 259, and/or the Graphics library 251, for processing and display through the appropriate Drivers 261 to the screen 102. In one embodiment the information or data may be stored or can be located in the Thematic Application/Publishing/Game Content library 260.

In one embodiment, the server Drivers 261 are instructions, connections, or translations that allow the input or output of data to be recognized by certain hardware for example a screen 102, phone 101, microphone, keyboard, pen, the internet 220 etc.

In one embodiment, the Voice library 255 and/or Audio library 255 will allow for the programming, and/or generation of the audio particular to a frame or to the 2D/3D images. In one embodiment, the Audio/Voice library 255 will interact with the GUI 200, Vendor Library 259, and can interface with the QIE(OS) 203 and/or the Graphics library 251, and the appropriate Drivers 261 will process the information for output. In one embodiment, Audio/voice is also used in this sense to take information via a microphone 104 or some type of input device 104 into the system, which is processed through the GUI 200, passed to the QIE(OS) 203 for processing and/or to the Audio/Voice library 255 for instruction to be passed back to the Graphics library 251 and back through the GUI 200 and Drivers 261 to be outputted through a set of speakers or output device (not shown). In one embodiment, the information or data will be stored or can be located in the Thematic Application/Publishing/Game Content library 260.

In one embodiment, the Music engine/library 258 maintains the specifications for the music, music state, and all the properties, data, logic, and rules and programming that are associated with the integration and output of music in the thematic applications. In one embodiment, the Music library 258 will allow for the programming, and/or generation of music particular to a frame or to the 2D/3D images. In one embodiment, the Music library 258 may interact with the GUI 200, Vendor Library 259, Drivers 261, and also the QIE(OS) 203, and/or the Graphics library 251. In one embodiment, after the Music library 258 finds the appropriate piece of music, the program 110 will transfer the data back to the GUI 200 and Drivers 261, to an output device or set of speakers. In one embodiment, the information or data will be stored or can be located in the Thematic Application/Publishing/Game Content library 260, or can be pulled from a satellite transmission via the satellite service system 210. In one embodiment, the Music engine 258 may release the memory 109 used upon completion of its task.

In one embodiment, the Mini-Applications library 254 will include programming code to create the appropriate application selected by the user. In one embodiment, the Mini-Applications library 254 can interact with the GUI

200, Vendor Library 259, and the Graphics library 251 for processing, and can interface with the QIE(OS) 203 and/or the Graphics library 251 for processing and display through the appropriate Drivers 261 to the screen 102. In one embodiment, the information or data may be stored or can be located in the Thematic Application/Publishing/Game Content library 260. The amount of information is determined based on the set of instructions, programming code, etc.

In one embodiment, the server-side AI engine 257 interacts directly with the Thematic Engine 201. In one embodiment, the AI engine 257 controls the behavior of objects that exhibit intelligence beyond that of the users or the thematic environment on the network. In one embodiment, the AI 257 may be used to manipulate objects, for example, such as NPCs (non-player characters) when in a thematic/gaming context, animal characters in thematic environments, and simple games within the game. In one embodiment, the AI 257 informs the Thematic Engine 201 when the object should be changed given the current set of AI logic. In one embodiment, the AI engine 257 disables local AI code when in multi-user mode and assumes those tasks. In one embodiment, the AI engine 257 may also rely on the real-time thematic database for spatial and contextual information.

In one embodiment, the AI engine 257 provides AI object duplication, relates AI objects to thematic environment objects, maintains the AI object state, provides data on object modification due to AI rules and thematic logic, provides secure transport of data to/from clients 101 and servers 120, receives data from the server 120, if provided, checks for errors in data, collects thematic environment state information from the client 101, and makes thematic environment state information available to the Thematic Engine 201, provides messaging services, and real-time file loading services.

In one embodiment, the Vendor library (manufacturer) 259 maintains the specifications for the vendor's product placement, display, storefronts, and all the properties, data, logic, and rules and programming that are associated with the integration and output of the vendor components or 2D/3D images in the thematic applications. In one embodiment, the vendor library 259 may interact directly with the Thematic Engine 201, the GUI 200, the Accounting/Billing system 202, Drivers 261, and the QIE(OS) 203. In one embodiment, Vendor data may be stored in the Vendor database 324, or may be stored in the Data Storage 205, Digital Content library 270, or pulled from a satellite transmission via the satellite service module 210. In one embodiment, the Vendor library 259 interfaces directly into the Thematic Engine 201, and will release the memory used upon completion of its task.

In one embodiment, the Sponsor library (advertiser) 328 (see FIG. 3) maintains the specifications for the Sponsor's product placement, display, storefronts, and all the properties, data, logic, and rules and programming that are associated with the integration and output of the vendor components or 2D/3D images in the thematic applications. In one embodiment, the Sponsor library 328 may interact directly with the Thematic Engine 201, the GUI 200, the Accounting/Billing system 202, Drivers 261, and the QIE (OS) 203. In one embodiment, the data may be stored in the Sponsor database 329, the Data storage 205, Digital Content library 270, or pulled from a satellite transmission via the satellite service module 210. In one embodiment, the sponsor library 328 will interface directly into the Thematic Engine 201, and will release the memory used upon completion of its task.

In one embodiment, each of the libraries—Translation 252, Film/Video 253, Mini Applications 254, Audio/Voice 255, Music 258, Sponsor 328, and Vendor 259—may obtain the appropriate information for data, voice, music etc., from the Data Storage 205 or other memory and/or the Thematic Application/Publication/Game content 260, and may maintain all the information for the profiling, "game" state, and business information and tracking, by accessing the Thematic Application/Publication/Game state component 262, and by connecting to the Thematic Application/Publishing/Game Logic and Scripting component 264. In one embodiment, the libraries will process the information, voice, data, music, etc., as appropriate or through the QIE(OS) 203, for display on the screen 102 or throughput to the digital devices speaker or speaker system, utilizing the Drivers 261 and Communications/networking interface(s) 514. In one embodiment, this option allows the user the use of the thematic application directly on his/her digital device 101 without connecting to the internet 220.

In one embodiment, the server Thematic Application/Publishing/Game state component 262 maintains the state or information of the virtual environment. For example, in a gaming environment, if the character moves to the right and stops, the Thematic Application/Publishing/Game state component 262 tracks the actual movements of what it took to make that character move and stop. If the object is transformed to a different object, the component 262 tracks the steps that it took for that image to be transposed. In one embodiment, the Thematic Application/Publishing/Game state component 262 will maintain the exact location of where the thematic application is stopped, such that the user can return to this same spot upon the user's return to the thematic application.

In one embodiment, the Thematic Application/Publishing/Game state component 262 also maintains the imaging, data, music, voice, film, etc. for that location. However, the content may indeed change depending upon other users/players/etc., and/or the update of information that has been added to or removed from the main system or the server 120. In one embodiment, although the user may be able to return to the same location and begin again, the program 110 may change the quests, questions, object(s), stores, merchandise placement etc.

In one embodiment, the Thematic Application/Publishing/Game Content component 260 may also provide multiple methods for accessing the objects and maintains a record of where objects are located. Other tasks may include providing caching of commonly used objects and a method to update objects.

In one embodiment, the Thematic Application/Publishing/Game Content component 260 may control releasing memory, initialize data access protocols, provide access to objects on local hardware and remote hardware, caching services, compression services, versioning services, updating of objects, error checking, a framework for sub-AI engines, and error handling.

In one embodiment, the Thematic Application/Publishing/Game Content component 260 may interact directly with the client-side server Thematic Application/Publishing/Game Logic and Scripting component 264, the graphics library/component 251, AI engine/component 257, as well as the Communications Network Interface 514.

In one embodiment, the server Thematic Application/Publishing/Game Logic and Scripting component 264 takes data from a rule set as well as from external sources and modifies the thematic environment. In one embodiment, rules may be static and retrieved from a data source, or they may be dynamically created from an application tool. In one embodiment, external rules will come from various sources and will arrive in a moralized manner. In one embodiment, all real-time modifications to the thematic environment may be routed through the Thematic Application/Publishing/Game Logic and Scripting component 264.

In one embodiment, the Accounting/Billing system 202 is made up of several sub-modules including the Administration/Time sub-module 330 and the Points/Rewards Information sub-module 331, the sub-modules which are directed to: accounting (i.e., purchasing, ordering, billing, shipping, and payment processing) for both the vendors and users, including all user information accumulated within the application (i.e., rewards and points, time (based on time zones), stopwatch or timer; creating/maintaining user profile information; a transaction database which tracks business intelligence data, licensing, rewards, points, time, and user info; maintaining the Vendor database 324 of business information; a User database 324 (i.e., order configuration, encryption & compression, library data); an Electronic messaging module 326 (i.e., e-mail, chat, or other applications via sub-module Email/Chat Applications 327); and interacts with the Business Intelligence service module 320.

In one embodiment, the Business Logic module 306 interfaces with the Business Intelligence service module 320 for business intelligence data, supplying the information to the vendor in real time offering all of the latest data which is tracked within the applications. In one embodiment, the Business Logic component 306 interacts with the Vendor database 324, providing relevant information (i.e., raw data, canned reports, etc.) to the vendor on the active user's consumer behaviors, including likes, dislikes, purchases, etc. In one embodiment, maintenance fees for upgrades and updates are automatically sent to the Sponsor database 329 where sponsors 329 have access to such information. Additional services are a subset of the Business Logic module 306, and include e-mail, chat, order entry, purchasing, billing, and vendor fulfillment modules.

In one embodiment, the Business Logic module 306 interfaces with the Data Storage 205 to update information on the active users, determining what information is relevant today vs. yesterday. In one embodiment, the Business Logic module 306 interfaces with the Thematic Engine 201 and then to the zone application builder and interpreter of the QIE(OS) engine 203. In one embodiment, the Business Logic 306 is written in C, C++, C#, Java, Python™, Curl™, and/or Assembler, or any other type of language appropriate to achieve the above-described features.

In one embodiment, the Accounting/Billing system 202 gathers business intelligence data from the Business Logic 306 and Business Intelligence modules 320, supplying the information to the user (stored in User database 325) or the vendor (stored in Vendor database 324) in real-time via Reporting Tools module 321, offering all of the latest data which is tracked by the program 110 within the applications. In one embodiment, the Accounting/Billing system 202 interacts with the Vendor database 324, providing relevant information (i.e., raw data, canned reports, etc.) to the vendor on the active user's consumer behaviors, including likes, dislikes, purchases, etc. In one embodiment, the maintenance fees for upgrades and updates are automatically sent to the vendors.

In one embodiment, the virtual platform of the present invention may use the support of PCs, or any other type of hardware that can support specific tasks at the Business Logic 306, Accounting/Billing system 202 and Thematic Engine 201. This may take the form of Grid, Artificial Intelligence (AI), or other technology advanced servers, or the entire system may be hosted on a very high-level supercomputing system that can calculate very complicated algorithms and manage all processes supporting well over millions of users simultaneously.

On condition that there are separate administrative servers 120 for billing and general customer care, they may be maintained in physically separate locations from the main servers 120. The underlying technology allows for replication to various other sites. Each new site can maintain "state" with its neighbors so that in the event of a catastrophic failure, other server systems 120 can continue to keep the application running and allow the system to load-balance the application geographically as required.

In one embodiment, the present invention operates in the metaverse—or one where the platform includes augmented reality, virtual reality, 3D, 4D etc. worlds, and the real-world in unison made up of persistent, shared, 3D virtual spaces linked into a perceived virtual universe. The metaverse in a broader sense may not only refer to virtual worlds, but Internet as a whole, including the entire spectrum of augmented reality. The metaverse is an extension of the internet and creates environments such as Extended Reality, User Interactivity (Human-Computer Interaction), Artificial Intelligence, Blockchain, Computer Vision, Edge and Cloud computing, and Future Mobile Networks. The metaverse ecosystem allows human users to live and play within a self-sustaining, persistent, and shared realm. Therefore, the metaverse ecosystem considers user-centric elements including Avatar, Content Creation, Virtual Economy, Social Acceptability, Security and Privacy, and Trust and Accountability.

Two technologies that may be used in conjunction thereof or separately, to manipulate the data and access the data, include imaging technology and holographic imaging technology. In addition, other technology language-based algorithms can be used in recalculating the content, shapes, graphics, images, music, and video (every type of media), in order that the data can be exposed, manipulated, and accessed on any device.

Although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, flash drives, CD-ROM, or other forms of ROM or RAM either currently known or later developed. Further, although specific components of the system have been described, one skilled in the art will appreciate that the system suitable for use with the methods and systems consistent with the present invention, may contain additional or different components.

Note that at times the system of the present invention is described as performing a certain function. However, one of ordinary skill in the art would know that the program is what is performing the function rather than the entity of the system itself.

The physical architecture of the present invention may include at least one co-located hosting site having racks containing server hardware blades running operation systems, and other necessary applications. The present application's co-located hosting sites may be deployed at two additional locations, providing full geographic diversity. These sites may be near major private or public peering points. The server hardware blades may be connected to storage devices using network attached storage (NAS); but could also be a combination of local disks and a Storage Area Network (SAN), and redundant Gig-E connectivity. The racks may be connected to the co-location hosting providers' switches providing direct connectivity to the Internet or contained in a single location. The present application co-location site may be fully redundant with multiple egress paths to the Internet. Interaction with the vendors and active users may be through secure and non-secure internet connectivity.

Overview of the Present Invention

As described above the present invention generally relates to an electronic apparatus and method for the sizing of merchandise such as clothing, footwear, soft goods, and hard goods, and managing the merchandise from the point of manufacturing to the point of sale. In one embodiment, the present invention is directed to an apparatus and method for sizing merchandise on a person's virtual body, avatar, or hologram, and to manufacture, and provide for purchase, goods that will fit the individual's body based on physical measurements of the individual captured by an apparatus at the time purchase.

The present invention also includes an apparatus and method for the collection, conversion, storage, tagging, tracking, security, and integration of a live inventory system, to view and track goods for purchase from a virtual closet, mirror, social network, game environment or device, to locate the goods and store location(s), to track the goods via a tracking mechanism such as a global positioning system (GPS) or satellite system, as well as by the use of a radio frequency identification (RFID) device, metallic thread, metallic inks, specialty inks, barcodes, programmable/intelligent sensors, or other types of security for tracking components of the merchandise as it is being manufactured. The goods may include smart devices that provide the user sizing or other information, and may include flexible chips, programmable threads, wearable strain sensors and heaters, conductive yarns/threads/materials, programmable carbon fiber, flexible memory-based fabric, and embedded controllers etc.

In one embodiment, the present invention may be used to size merchandise from the point of design to the cutting of the materials, goods, or merchandise. In one embodiment, the present invention tracks the sizing of the merchandise as it is being manufactured by capturing via a scanning or image capturing device such as a camera (i.e., digital camera), a mirror (i.e., with embedded cameras), flat digital mirror/screens, a scanner, a wand, a square box, a digital closet, a stand (with cameras on poles, etc.), a store (with 360 degrees 3D imaging cameras etc.), etc., and submitting the data to an application or system for rendering; storing the information; and merging data for each piece of merchandise to produce the correct size item.

The present invention is also directed to the management of the industrial equipment for failure and production management, capturing the user's image and determining/calculating the user's actual size, and fitting the person's avatar, room etc. with the merchandise for either purchase, production of a catalog or other type of application designed specifically to support the user.

In one embodiment, the present invention includes populating a live auction and bartering system with the goods in an interactive software application, virtual world or metaverse, social network, commercial and/or game application, which provides a real-world experience to the user.

In one embodiment, the present invention encompasses a user's cell phone, remote control, or liquid crystal display (LCD) panel on any display device of a computer, programmable intelligent sensors (i.e., used in clothing, for example), and in manufacturing, can encompass use of a wand, sewing machine, blow molding device, soft goods manufacturing equipment, and hard goods manufacturing equipment.

In one embodiment, at least one of the scanning and/or image capturing device or one of the embedding devices, is a measuring wand containing the QIE(OS) 203 or a combination measuring wand and embedding device. In one embodiment, the wand sends information through a communication cable, wireless, or some other type of networking system, to the client, server or both.

In one embodiment, in the manufacturing process, the image capturing device may be embedded in a sewing machine, blow molding device, cutting machine, or any other equipment used in the manufacturing of clothing, footwear or any type of merchandise or goods including furniture, home goods, etc. In one embodiment, the imaging capturing device, the sewing machine, blow molding device, cutting machine, or other devices used in the present invention, all have a controller, intelligent chip/high powered cray-type of chip or intelligent programmable sensor, that contains a processor having the QIE(OS) engine 203 for processing and a Digital Content library 270 for storing the information gathered.

In one embodiment, in addition to the QIE(OS) engine 203 and Digital Content Library 270, the image capturing device includes the AI engine 257, the Thematic Engine 201, and Communication devices 271 to connect to a computer 101 via wireless communication or by ethernet or other cable systems.

In one embodiment, the information on a user or merchandise is captured by the image capturing device and stored in hard drive, controller, virtual memory for processing and storage, or sent directly to a computer, IPAD, phone, server, intranet, satellite, WWW, Internet, or other system. Thus, anyone who is designing, and manufacturing goods can manage the goods and merchandise being manufactured, as well as anyone who wants to purchase the goods, now has a system that allows them to try on the merchandise from a virtual environment or metaverse either on a hologram or avatar of themselves or image of the individual they are purchasing the goods.

The present invention may be used in merchandising, entertainment, business, publishing, and other applications to provide a virtual and real-world or metaverse experience to the user by integrating audio, video, 2D, 3D, 4D, 5D and other technologies, that may enhance the user's experience. In particular, the program 110 of the present invention injects real-time data, such as pricing, film, music, news, etc., into a virtual thematic environment and/or metaverse which includes both audio and video, and also integrates mini-applications, such as word processing, banking, spreadsheets, purchasing (i.e., e-commerce applications, and any other type of application that can be scaled or as a demo), e-mail, and the like, into the virtual thematic environment, without a noticeable delay. The present system can be both a rich graphic environment, and may also include a holographic system and technology, mirror imaging technology, and high-level algorithms. The present invention can provide a virtual 2D, 3D, and/or 4D, or 5D, virtual environment and/or metaverse which can include not just audio, music and video, but sensitivity to touch, the sensing of odors etc., so that the user can experience a real-world environment in which the user can move through in real-time in any application, thematic application and/or metaverse.

Operation of the Present Invention

Figure 4:
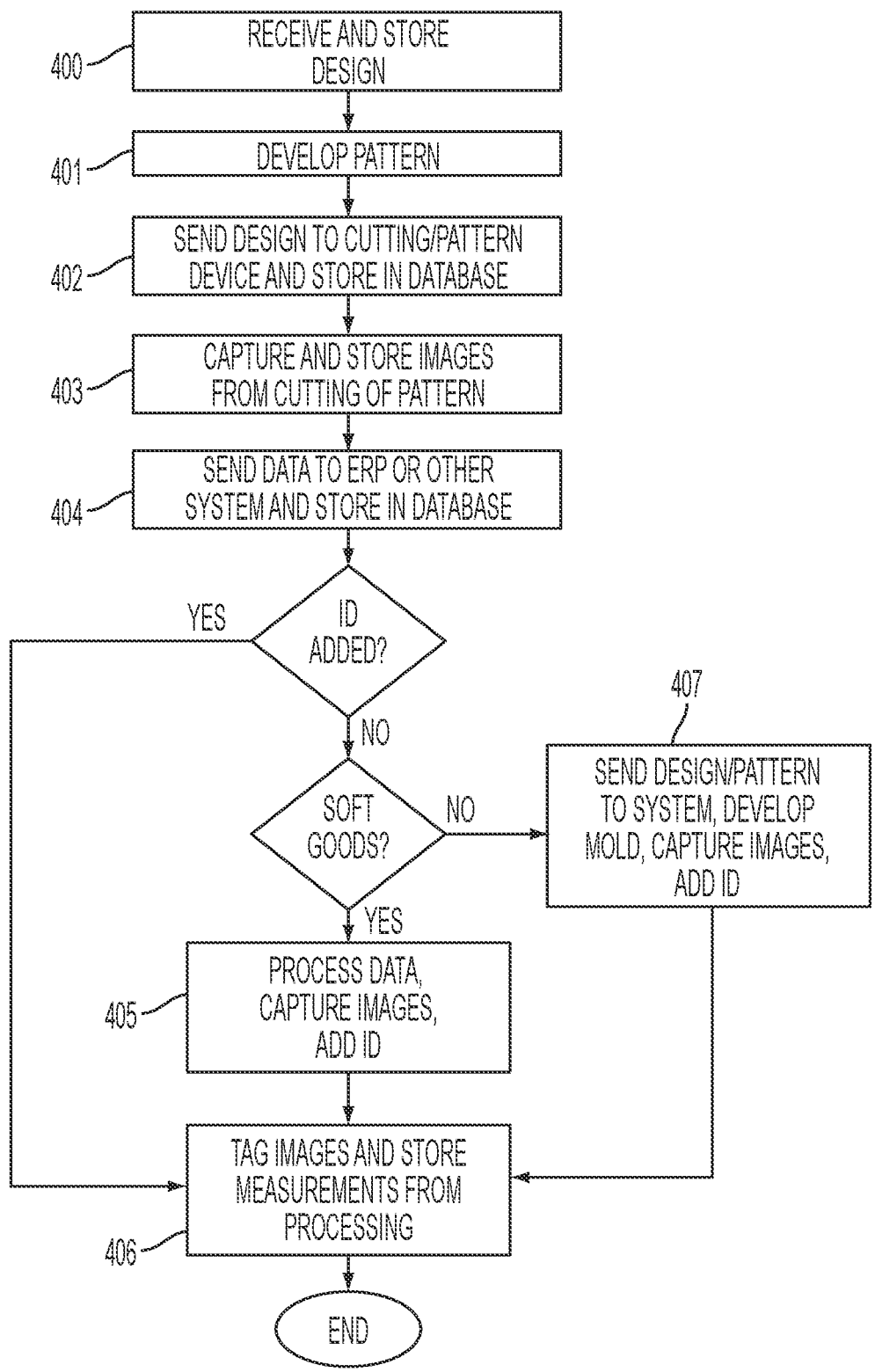
FIG. 4 is a flowchart of a method of embedding identification into a piece of merchandise to obtain measurements thereof, according to one embodiment consistent with the present invention.

In one embodiment, designers create their designs by sketching their designs onto a pad of paper or onto a tablet, phone, computer system 100 or other client device, and the designs are saved in a client storage device 113 or in the cloud in step 400 (see FIG. 4).

In one embodiment, the next step or process is to develop a pattern. In one embodiment, this pattern may be developed by a designer in any type of art/design application, CAD/CAM application, or sketched drawing, which is then saved by the program 110 in a data storage 205, 114, or scanned and saved in step 401, into the storage device 113, 114 of a client computer system 100 or application.

Figure 5:
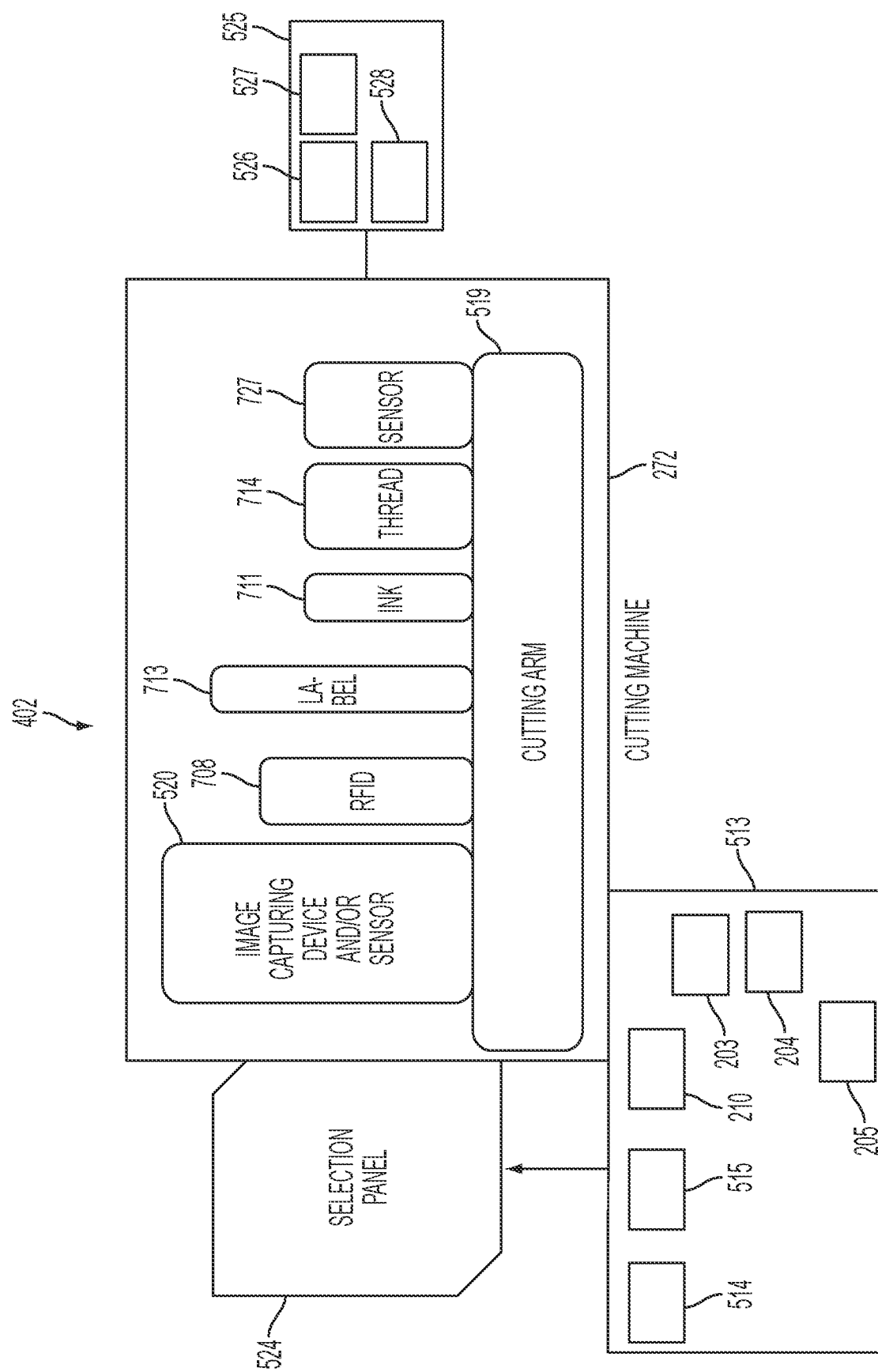
FIG. 5 is a schematic diagram of a pattern, cutting, and marking machine and capturing device and/or an intelligent sensor and hardware connecting to and processing information from different devices or engines, according to one embodiment consistent with the present invention.

In one embodiment, upon request by a user or equipment manufacturer, the program 110 of the present invention then accesses the storage device 113, 114 and sends the stored pattern, in step 402, to the cutting device or pattern machine 272 (see FIGS. 2 and 5) having a controller 513, for processing, via a communication link 514, wireless 515, satellite transmission 210, etc., where the pattern is stored, on another storage device 205, such as a hard drive 205, by the user or the equipment manufacturer. The program 110 instructs the cutting device 272 to use the information in an application to cut the material using cutting arm 519 and develop the pattern.

In one embodiment, the cutting device 272 of the present invention may be designed with an image capturing device 520 (see FIG. 5) and/or an intelligent sensor, and the program 110 captures the measurements or information as the pattern is being cut by a user or cutting device 272, and stores that information on a storage device 113, 205 114, or in a temporary storage area of the image capturing device 520 (which includes all the components of a computer, such as processor, memory, etc.) or intelligent sensor, in step 403, in the format of a 2D, 3D, 4D, 5D, hologram or other type of image, as well as half tone, line art, scanner, and store type capabilities.

In one embodiment, the image capturing device 520 (see FIG. 5), is used with the cutting device 272 or separately for any image capture functions, may be a camera, cell phone, video camera, or input device 104 with interchangeable lens and selection criteria. The image capturing device 520 may have cropping, scanning, altering, blur-free, or other existing technologies, and selection buttons for changing the lenses for imaging capture. The image capturing device 520 may have selection criteria for the type of image via a digital menu option or a selection criteria/toggle switch at the back of the device 520.

Figure 6:
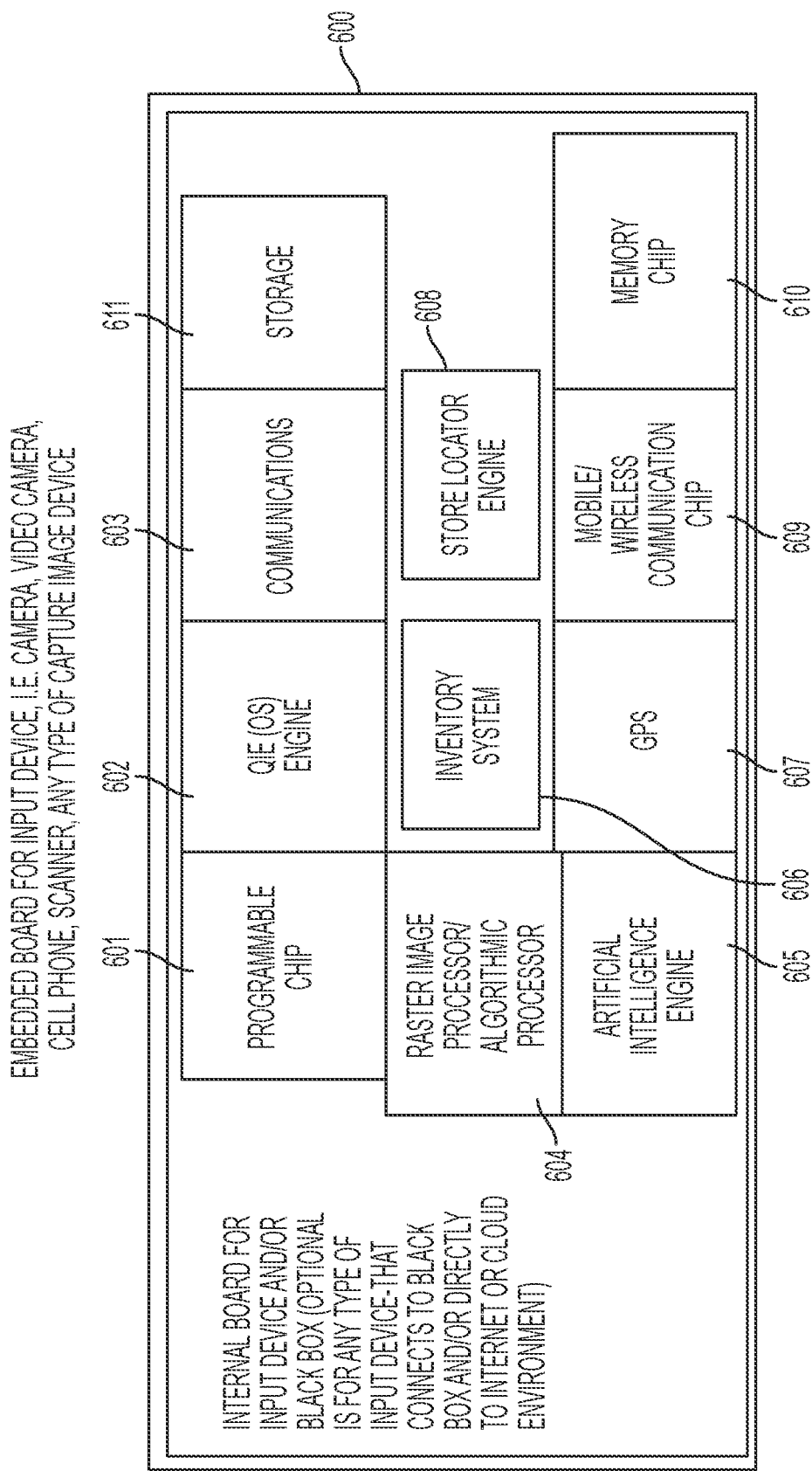
FIG. 6 is a schematic diagram of the embedded board of an input device showing various components, according to one embodiment consistent with the present invention.

In one embodiment, the image capturing device 520 includes an internal board 600 (connecting directly to the internet 220 or cloud or via a black box) (see FIG. 6), which includes at least one of a programmable chip 601, the QIE(OS) engine 602, communications module (in/out) 603, raster image processor/algorithmic processor 604, artificial intelligence (AI) 605, inventory system 606, GPS, store locator engine 608, mobile/wireless communication chip 609, memory chip 610, and storage 611. In one embodiment, the image capturing device 520 communicates via communication link 514 to other devices, such as the GUI 200, and the thematic publications engine 201.

In one embodiment, the program 110 of the capture imaging device 520 submits the captured information during pattern cutting, directly via a communication link 514 or wireless 515 and in some cases, satellite transmission 210 to an enterprise resource planning (ERP) system 400 in step 404, or to another manufacturing device or system 525 which processes that information for further use, such as a sewing machine, or assembling machine (i.e., for footwear assembling and/or sewing), blow molding device, etc., each having a selection panel 526 and controller 527, and a storage device 528 where the information is stored.

In one embodiment, the QIE(OS) engine 203, which may be located on a black box on the client system 100, or in the image capturing device 520, on the world wide web (WWW) and/or internet, and in some instances, depending on the intelligent sensor, incorporated in the sensor, performs the processing on the pattern cutting, and captured information in this or another application.

In one embodiment, the black box contains a QIE(OS) engine 203, AI engine 257, and may or may not contain a Thematic Engine 201, and/or Digital Content Library 270 for processing, connecting to a non-intelligent image capturing device 520. The black box connects to a manufacturing equipment such as a blow molding or other type of device to mass produce goods or to a server for processing.

In one embodiment, with respect to soft goods, the QIE(OS) engine 203 and AI engine 257 processes the cutting measurements or mapped data saved in the storage 205 and/or storage 611, into an image, ID, label 720 (see FIG. 7), or RFID chip 719, ink 710, specialty memory thread 715, or bar code 721 developed with specialty ink 710, which is added by the user to the sewn material in step 405, as a type of code sizing, or actual sizing, of the cut piece. These images, chips, threads etc., contain the embedded measurements of the sewn material or produced goods at the completion of the sewing process.

In one embodiment, the QIE(OS) engine 203 of the present invention automatically tags the captured image(s) from the capture imaging device 520 or sensor during or after the above processing with an ID/Code, in step 406, and all the measurements are compiled by the program 110 using an AI system 605 and stored with the image in a temporary storage area 611 of the image capturing device 520 or sensor, memory chip 610, or in a storage device 205 at the client or server.

In one embodiment, in the cases where the ERP 400 is not capable of accepting the format of the image, the image will be sent by the program 110 to an interpreter module (i.e., QIE(OS) engine 203) for conversion, or interpretation, formatting, and processing, and thereafter, the image will be sent in the appropriate format to the ERP system 400 to be processed appropriately.

In one embodiment, where hard goods such as luggage, glasses, etc., are produced, the program 110 may send the design or pattern to a molding device (not shown) or other system, where the program 110 develops a mold from the pattern in step 407, to make more of the same item at the exact size, width, dimension etc., and where identification of the goods is embedded therein. If the merchandise are soft goods, the identification is sewn into the merchandise. In one embodiment, during the manufacturing process, the image capturing device 520 and/or an intelligent sensor captures the image data as it is being developed or manufactured. In one embodiment, the image data is then processed in the QIE(OS) engine 203, as noted above, and the captured data and image is tagged with an ID/Code in step 406, which includes all the measurements compiled and stored with the image.

Thus, during or upon completion of the manufacturing and development process for both hard and soft goods, a bar code 721 developed with specialty ink 710, image, ID label 720, or RFID chip 719, or specialty memory thread 715, will be added by the program 110 to the manufactured/produced material that has the embedded measurements and the ID/Code in steps 405 and 407, and the images tagged and stored in step 406. The information will be stored by the program 110 in a storage device 205 or memory 610, 611 etc., in a 2D, 3D, 4D, 5D, hologram or other type of image format, or may be submitted directly via a communication link 514 or wireless 515 and in some cases satellite transmission 210 to an ERP system 400, and may be sent to the QIE(OS) engine 203 or another application, for further processing.

In each of the above embodiments, the data and images captured, can be sent directly by the program 110 to the QIE(OS) engine 203 and processed for use in a thematic application, business application, inventory system, or for further processing by the QIE(OS) engine 203 based on the instructions provided.

Figure 7:
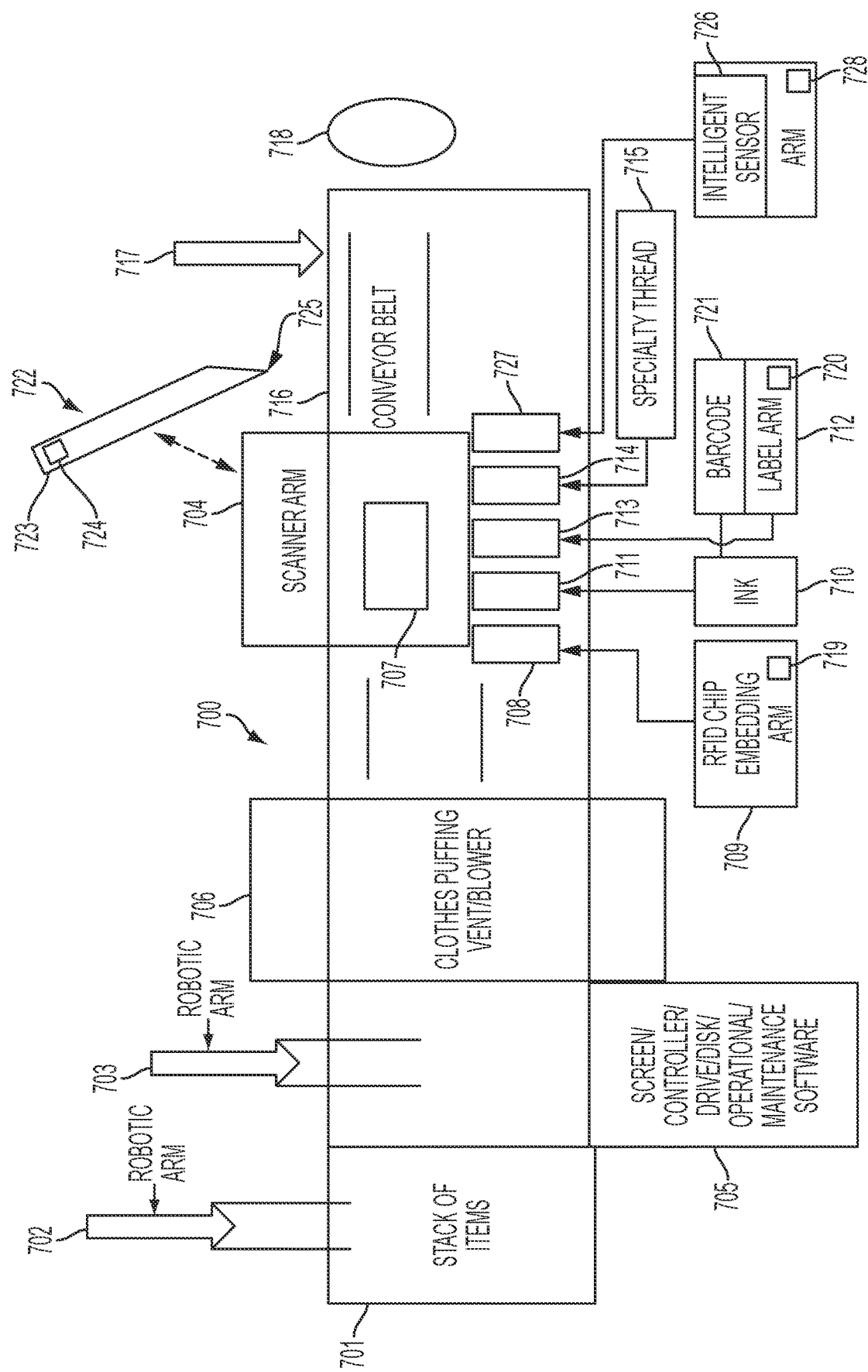
FIG. 7 is a schematic of a conveyor device using robotic arms for embedding identification and tracking devices in goods, according to one embodiment consistent with the present invention.

In one embodiment, the manufacturing method of tagging the goods processed above, as described in steps 405 and 407, are expanded upon below (see FIG. 7).

In one embodiment, in a tagging/ID system, a stack of completed (i.e., sewn or assembled) items 701, such as clothing, goods, merchandise, footwear, etc., are placed on an industrial conveyor system 700 that has, for example, a screen/monitor, and black box 705 including a drive/disk, and operational and maintenance hardware and software.

In one embodiment, the conveyor belt system 700 includes a conveyor belt 716 which moves the products 701, the conveyor belt system 700 which contains a combination of intelligent sensors, a robot and/or robotic arm(s) 702, 703, clothes bin 718, and a control panel 707 which measures the completed merchandise, attaches a label 720, RFID chip 719, bar code 721, ink 710, thread 715 or other type of technology containing information including the size of the final product.

In one embodiment, the robotic arms 702, 703 receive their instructions from the program 110 and each pick up one piece of clothing or article 701, singly, and places the item 701 on the conveyor belt 716.

In the case of soft goods, such as clothing, the conveyor system 700 may have a puffing/vent/blower system 706 that flattens the clothing and stretches it.

In one embodiment, a robotic/electronic arm/image capturing system/scanner 704 scans over the completed goods, merchandise, or article, and utilizing an intelligent scanner/intelligent sensor, scans and collects the information (i.e., images, data) from the entire completed merchandise or goods, and saves it to a storage device in black box 705 or other storage 205.

In one embodiment, the robotic/electronic arm/scanner 704 includes a measuring light box 707 or some type of box which includes a disk drive, wireless chip, controller, communication link and a QIE(OS) engine 203 and/or an embedded QIE(OS) controller 513. Depending upon the size of the box 707, the program 110 scans the merchandise or goods on the conveyor belt 716, captures the images, and stores same in the black box 707 or 705.

In one embodiment, the program 110 calculates the measurements of the goods using an algorithm, or processes the measurements in the QIE(OS) engine module 203, and develops a final ID/code for security purposes, and the robotic/electronic arm/scanner 704 embeds that code into the merchandise via an embedding device instructed by the QIE(OS) module 203. The robotic/electronic/scanner arm 704 includes one or more of a scanner, or intelligent sensor, which scans for an RFID chip 719 embedded by an RFID chip embedding device 708 via RFID embedding arm 709, a label 720 or symbol or other type of technology, or code, embedded by a label embedding arm 712 of a label embedding device 713, specialty ink 710 embedded by an ink embedding device 711 via label embedding arm 712, a specialty thread 715 embedded by a specialty thread embedding device 714 into the merchandise, and/or an intelligent/programmable sensor 728 embedded by a sensor embedding arm 726 of a sensor embedding device 727, etc. The robotic/electronic arm/capture image device/scanner 704 includes these or additional embedding devices to operate on, sew, glue, and permanently label the goods or merchandise, as well as to capture and store the images thereof.

In one embodiment, after measurement and labeling, the merchandise is then seized at the end of the conveyor belt 716 by a robotic/electronic arm 717, which moves the merchandise to a container 718, and/or caught by a basket 718 or some other type of container at the end of the conveyor belt 716, that catches the final product to be sent to distribution and inventory.

In one embodiment, instead of using a robotic/electronic arm/scanner 704, a robotic device 722 such as a measuring wand 723 (see FIG. 7) with an ink needle 725 is used, and/or a stamping prong 722 with embedded chip 724 or intelligent sensor, including a wireless chip, and controller, with embedded programming for these devices, including an embedding device for embedding an RFID chip 719, specialty ink 710, thread 715, label 720, sensor 728 or barcode 721, which make up the wand 723. The wand 723 may be, in some cases, part of an input capturing device 520.

In one embodiment, the wand 723 or scanning/measuring box contains different types of components, including chips, scanning lenses and/or camera. In one embodiment, the QIE(OS) engine 203 captures the size of each manufactured piece, calculates the measurements, and transmits this information to the embedding devices. The QIE(OS) engine 203 utilizes devices such communication link 271 or disks, removal disks, USB, or other devices to transfer the embedding devices' data to other devices.

In one embodiment, the robotic device 722 or wand 723 is used to scan the merchandise 701 by hand and embed the clothing/goods 701 with a final ID or Code with the final measurements. In one embodiment, the size of the merchandise is determined by the program 110 calculating all the angles, and using a mapping mathematical formula into a standard size.

In one embodiment, one or more intelligent programmable sensors containing the QIE (OS) engine 203 are embedded in manufacturing devices such as a sewing machine, blow molding device, cutting machine 272, or box attached to any of the equipment and/or and any other equipment used in the manufacturing of clothing, footwear, or goods, and stores all the data into a storage medium for further use.

In one embodiment the intelligent sensors and/or capturing device 520, 704, 707 capture all data as the goods are being manufactured and store the information into a drive or storage medium 205, 611, 801 or device that produces an identification or bar code, and transfers the data to an electronic memory thread, ink, RFID chip, or other type of digital marking, via satellite, WWW, Internet, wireless, fiber optics, networking device, or cable, the data with the information that can be embedded, sewn, glued, or permanently applied to the clothing, footwear, or goods containing the information captured, as the merchandise was being developed for the size, or specification of that particular piece of merchandise, which is further provided a unique identification (ID) for security purposes.

In one embodiment the intelligent sensors 520, 704, 707 provide information that is transmitted to a dashboard, cell phone, PDA, controller board, computer screen or other digital device displaying any equipment failure, number of products produced, any fault in production, and downtime and other relevant information, In one embodiment, the final ID/code with image, after processing, is then sent wirelessly via Communications module 271 and wireless system 515, by the program 110, from the black box 707, or storage 205, to an ERP system 400, inventory system 800, and to the QIE(OS) engine 203, Thematic engine 201, or other system for processing, storage etc. The image will be either in a 2D, 3D, 4D, 5D image, hologram or some other appropriate format.

The inventory image system 800 (see FIG. 8) makes the images from input devices 520 available to the store locator engine 608, which is connected to a GPS 607, and allows a multi-store location inventory image system 606 to access the store and manage the inventory therein, including utilizing the 2D or 3D removable tagging engine 802 to tag inventory items, using GUI 200. Other systems may be accessed, including a voice recognition system 207 for online customers, a polling engine which checks inventory items, an Accounting/Billing system 202, as well as a security system 273 to manage security of the operations.

Thus, in one embodiment, the present invention tracks the sizing of the merchandise 701 as it is being manufactured, by capturing, storing, and submitting the data to an application or inventory system 800 for rendering (see FIGS. 7-8), and merging data for each and every piece of merchandise 701. Thus, anyone who is designing and manufacturing goods has the ability to manage the goods and merchandise being manufactured, as well as anyone who wants to purchase the goods, now has a system that allows them to try on the ID/coded merchandise from a virtual environment.

Figure 8:
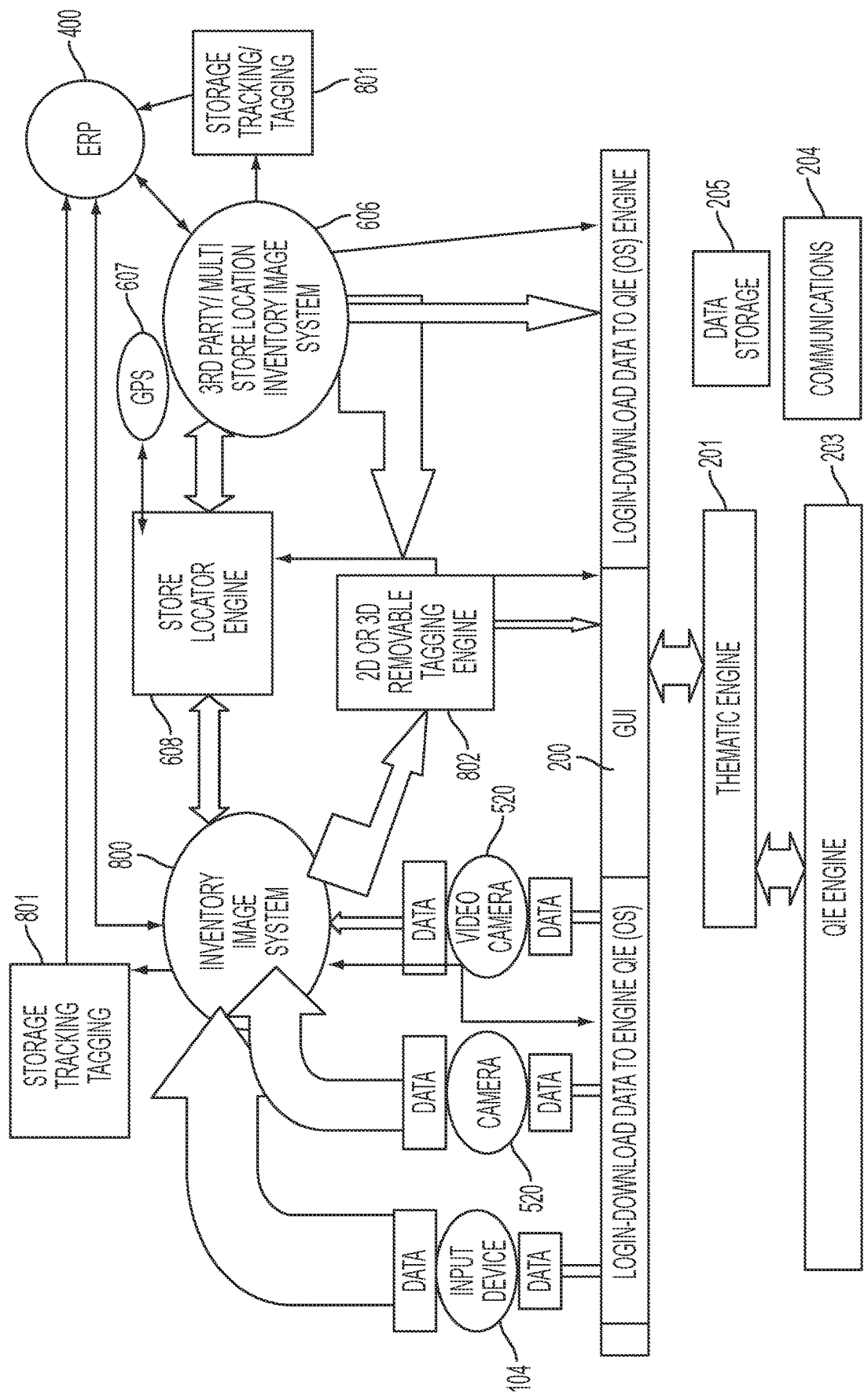
FIG. 8 is schematic diagram showing how at least how captured images are taken and transferred to either an inventory system, or directly to the processing engine for storage, processing or both, according to one embodiment consistent with the present invention.

In one embodiment, the digital ID or ink 710, label/code 720, thread 715, RFID chip 719, sensor 728, etc., are tracked by the program 110 in the inventory system 800 (see FIG. 8). For security purposes, the tracking information codes are read by an intelligent sensor booth, hand-held or other device 722, as the merchandise leaves the manufacturing (or retail) location/building, and the program 110 will send a signal to the main inventory system 800 for tracking purposes.

Consequently, a manufacturer or user can track the goods via a global positioning system (GPS) 212 and satellite system 210, using the radio frequency identification (RFID) 719, metallic thread 715, metallic inks 710, specialty inks 710, barcodes 721, intelligent sensors 728, or other types of security embedded for tracking components of the merchandise 701 as it is being manufactured, and once it has left the manufacturing environment to storage or retain environments. In one embodiment, the goods 701, and the location thereof, whether in a store location, or a home location, can be provided by the program 110 to the inventory system 800 or a user based on the information from the tracking mechanism. Further, this tracking information can be provided to a user who purchases retail goods from a virtual store, virtual closet, after trying clothing in a virtual mirror, environment or device, etc., so that they can track the items from location, purchase, to delivery.

In one embodiment, a third party or third party vendor will use their own imaging capture equipment 520 to capture their images, a digital mirror that contains a minimum of one type of image capturing image device 520, or enter their measurements into a computer system 101 application either via a cell phone, 104 voice, menu, typed, touch or other immersive type device, to calculate the size, process and rasterize the images into the proper format, and either maintain them in their own storage location, and/or transferring/transmitting/teleporting the files to a store or environment of their choice, internet cloud, or portable device for the application/game for use. The device allows the user to also have selections such as, for example, computer/internet, voice activate, camera mode, video capture mode, input capture mode, store, mall, street view, TV, etc. Each of the selections will send a signal to GUI 200 and the thematic application (i.e., Thematic Engine 201) for processing. The data is then transmitted to the QIE(OS) engine 203 for further processing, and if required, for the program 110 to transmit the information/data to the appropriate or respective services, client, software, applications, database, hardware, etc.

In one embodiment the sizing, or tracking information is translated from one language to another (i.e., non-English language), in the language specified by the individual, or by the designer, to the individuals cutting, sewing, producing, manufacturing, the merchandise, goods, apparel, footwear, etc., as well as those who are purchasing goods from a foreign country, or a storefront owner/salesperson who does not speak the language understood by the user.

In one embodiment, once the goods 902 (see FIGS. 9A-9B) have been marked with a final code, the goods 902 are shipped to a store, or the image containing the final ID/code is placed by the program 110 in inventory in a digital or virtual store, location, or other area. For clothing, the merchandise could be disposed on an electronic shelf 900, glass cases, clothing rack containing GPS and/or chips, or an electronic hangar 903. The electronic shelf 900 and electronic hangar 903 have intelligent sensors 901 or embedded applications that obtain, read, and process the ID/code of the merchandise, all of its attributes including the size/measurements, GPS information, and communicates wirelessly to a client electronic device 101 and displays that information—including measurements and sizing information on the merchandise—for the user.

In one embodiment, if the merchandise is removed without being purchased at a retail location, the program 110 would sense the ID/code as it leaves the store, sends an alert to the security system to trigger an alarm, or a flashing light (i.e., color coded, or some other code, or type of security flag) at the location, and which provides an alert on a monitor, cell phone, digital screen, dashboard or other system, to the relevant user, that the merchandise was removed and not purchased. The program 110 transfers the information to the Business Logic 306 and Accounting/Billing System 202.

In one embodiment, the ID/codes can be activated by the QIE(OS) module 203 to locate the merchandise using a GPS signal or satellite transmission, and can provide all specifications of that merchandise and its location to a user.

In one embodiment, the present invention has the option of the program 110 running a monitoring application on a digital device 101 that receives information from intelligent sensors, or the image capturing device, etc., that tracks equipment failure, the number of pieces or goods manufactured, the type of goods manufactured, the time taken for production, any fault in production, downtime, the cost of the produced goods, and any other relevant information. This information can be sent by the program 110 (by satellite, internet, or other communications), via an email or text message, or to a dashboard display, or externally to a computer or display screen 102, other digital device (PDA, controller board, etc.) 101, or cell phone 101, etc.

In one embodiment, the present invention includes an apparatus and method for sizing merchandise on a person's virtual body, in order to purchase goods that will fit the individual's body at the time of capturing the person's physical measurements.

Figure 10:
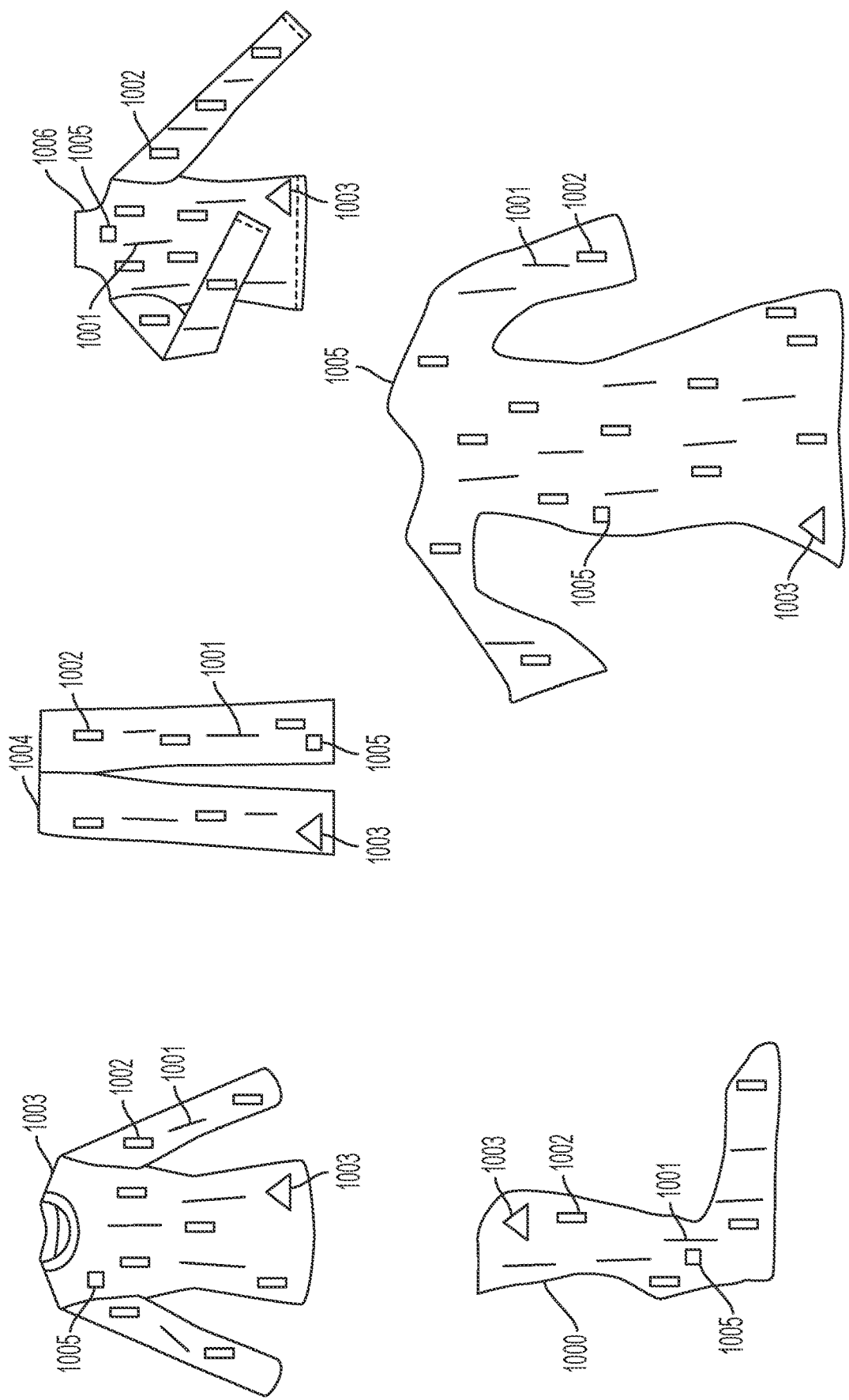
FIG. 10 is a schematic diagram of a plurality of clothing items containing sensors to provide user sizing information, according to one embodiment consistent with the present invention.

Specifically, in one embodiment regarding footwear, a sock, stocking, slipper, or some type of foot covering 1000 (see FIG. 10), is made up of stretchable, breathable material that contains specialty threaded sensors, labels, or threads 1101 etc., when placed onto the foot and ankle, captures the measurement of the foot and ankle and transmits this information via a wireless connection from an electronic device 104 (i.e., scanner for a computer, PDA, etc.) to a storage device 205 such as a hard disk, mini disk, portable disk application, in an inventory system 800, for processing (see FIG. 10).

In one embodiment, the sock, stocking, slipper, or other foot covering 1000 is made up of at least one of: a stretchable, breathable conductive yarns/material; a flexible memory-based fiber that contains an identification 1001 such as specialty threaded sensors or threads, or conductive ink, or a fiber optic thread; or programmable intelligent sensors 1002; a stretchable or bendable battery 1003; or a controller 1005 containing the QIE(OS) engine 203 etc. In one embodiment, the foot covering 1000 is placed onto the foot and ankle and tightens to capture the measurement of the foot and ankle and transmits this information via a wireless connection to storage 205, 114 including a hard disk, mini disk, portable disk, or connected via an ethernet or other type of cable directly to the computer system 100/120.

Similarly, in one embodiment, a piece of clothing (i.e., a pant 1004, a dress 1005, or a sweater 1006) covering at least part of the end user's body (see FIG. 10), if not the entire body, and made up of a stretchable breathable material that contains specialty threaded sensors 1002, or threads 1001 or labels etc., and optionally a temperature mechanism 1005 when placed onto the body, will mold to the body and form and capture the person's size in each area such as the upper arms, wrist, ankles, legs, upper torso, etc. In one embodiment, the labels 1001, threads and/or intelligent sensors 1002 will capture the person's measurements and transmit this information via an input device 104, via a wireless connection to a storage device 205, such as a hard disk, mini disk, portable disk, or online inventory system 1200 or application, for further processing.

Figure 11C:
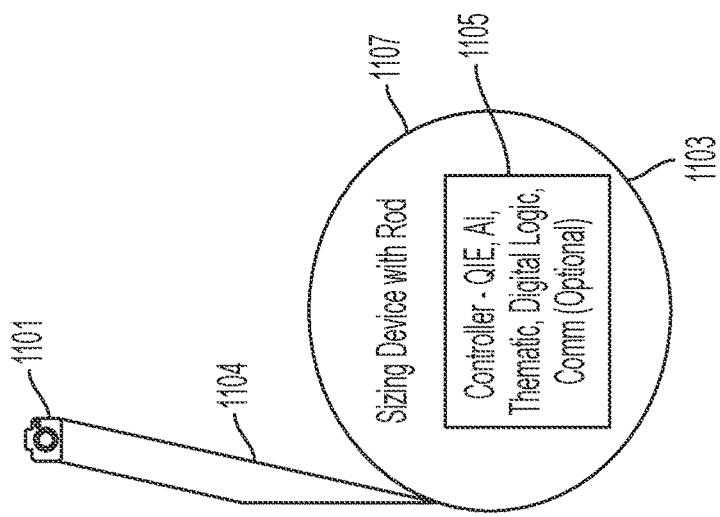
FIG. 11C is a schematic diagram of a round platform, with attached rod and camera, according to one embodiment consisted with the present invention.
Figure 11B:
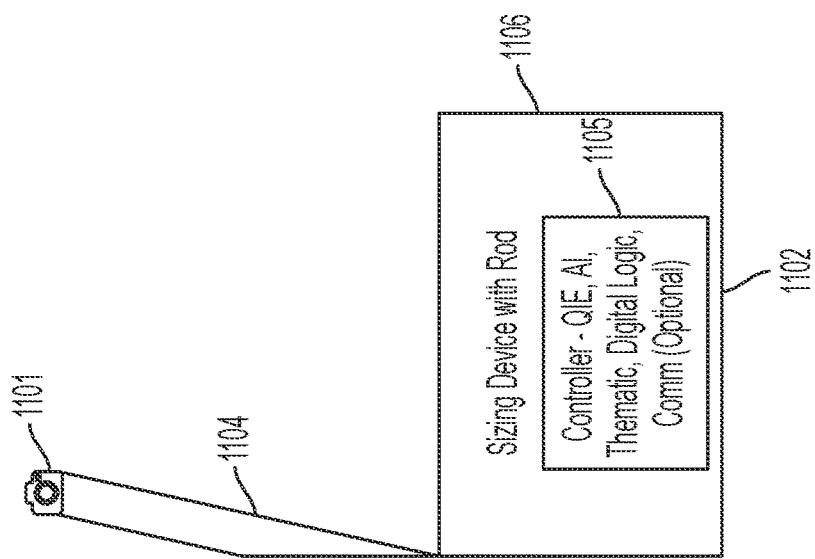
FIG. 11B is a schematic diagram of a square platform.
Figure 11A:
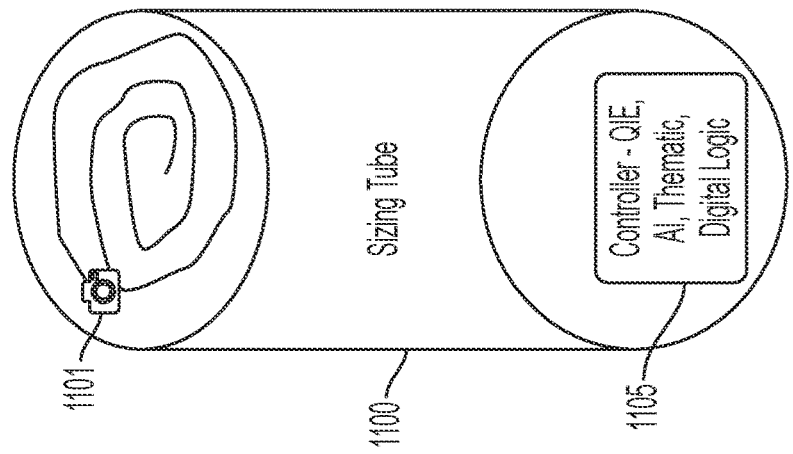
FIG. 11A is a schematic diagram of a sizing tube with track overhead and camera.

In one embodiment, the measuring system is a tube 1100 (see FIG. 11A), such as a plexi-tube, with a minimum of one camera 1101 overhead on a rotating belt or track that takes the image of the individual for sizing. In one embodiment, the bottom of the tube 1100 is flat, circular or square. In one embodiment, the plexi-tube 100 has a door that closes to complete the tube. In one embodiment, the measuring system 1100 is a portable device which contains a controller that implements the QIE(OS) engine 203, and at least one of the Thematic Engine 201, the AI engine 257, or the Digital Content Library 270, etc.

In one embodiment, the measuring system 1106 is a round portable device 1102 (see FIG. 11B) or the measuring system 1107 is a square/rectangular portable device 1103 (see FIG. 11C), where a camera 1101 is connected via a rod/pole 1104 that measures the individual as they rotate and move around the portable device. In one embodiment, the camera 1101 may or may not be fully configured to include the controller board 1105 containing the QIE (OS) Engine 203, or can connect to a black box, IPAD, computer, or other type of device via communication cable, wire, wireless connection, etc. The round measuring device 1102 or square measuring device 1103 can be managed by battery or plugged into the wall.

As noted above, the present invention can also take measurements of a user using a wand, technical box, mirror with embedded cameras, digital screen, glass/plexi-glass tube, stand with one or more cameras with controller (optional), on a rotating track, or stand with camera and rod/pole that holds a camera with pole that rotates around the persons, multi-panel mirror or other device.

As described with respect to measuring system 1100, in one embodiment, the cameras contain a controller board (optional) with the QIE engine module 203, communication device/cable/wireless capability or wired network to connect to a computer-type system which calculates and maintains all of the measurements by component, and then embeds this data into a label, ink, bar code, specialty thread for sizing purposes, security and tracking, as well for containing the description, vendor, class, color, material type, price of the goods and inventory. In one embodiment, a non-intelligent camera connects to a black box and/or sends the information for processing to the black box for processing.

In one embodiment, the sizing information is sent by the program 110 directly to the thematic environment (created by Thematic engine 201 and QIE(OS) engine 203 etc.) to determine where the information should be forwarded for processing. If the information needs further processing or formatting, the information will be sent to the QIE(OS) engine 203 and to the appropriate entity (i.e., ERP 400, etc.). If the information captured is in the correct format, the information may be stored by the program 110 in a storage device 205, then in one embodiment, sent to designer for "merchandise on demand", such as an "on demand shoe", for example, or to a local storage device 205 or database that is managed by the user, for future use.

To enter the virtual store, the individual logs into the client 101 via input selection, or voice recognition by speaking into a microphone that may be part of the computer system 101, of a cell phone, PDA, tablet, TV, game box, robot or other digital input device 104. If the language spoken is not in the system's native language, the program 110 will invoke the translation engine 208 (see FIGS. 2 and 3) on user command, that services the system. The engine 208 will translate the language into the native language of the user by representing text, voice, or a combination of the two.

In one embodiment, the present invention may be used by an end user in a virtual environment or metaverse. In one embodiment, the user may utilize the program 110 in shopping online, in a virtual environment, metaverse, social network, store, business, or either from a virtual closet, computer environment 104, cell phone 104, or in a physical store location and browse for goods that are sorted by vendor, price, style, cut, size, and/or a combination of the elements.

In one embodiment, the program 110 (accessing GUI 200 module) will display on the screen or display device 102, the merchandise, including glasses, watches, clothing, etc., as digital data/images. The images can be in the format of 2D, 3D, 4D, 5D, hologram, or other image format. The merchandise or goods will be displayed on the display 102 either in a real world, virtual world, and/or combination virtual/real environment or metaverse. In a virtual environment or metaverse, the user will be able to walk down the street and view stores and shops, and enter into a particular store to view the merchandise, locate the store and/or merchandise via GPS, or have the images of the merchandise sent to their own store location for viewing, trying on (if it is clothing, footwear, or other products, etc.) either virtually, or on an avatar, or physically in the real world, before purchasing the merchandise.

In one embodiment, the user(s) is exposed to the actual location or Zone provided by the GPS, satellite, or user input, application input or other type of input, of the exact location of the merchandise, goods, or clothing. In one embodiment, the Zone locations are the actual physical location of a rack in a store, shelf, hangar, glass case, closet, address, location in a home. In one embodiment, the Zone software application is part of the thematic environment supplied by the Thematic Engine 201 and Digital Content library, and information is stored by the QIE(OS) module 203 in either the Digital Content library or directly in the Thematic Engine 201 depending upon the storyline, theme, or real time information provided. This is all completed at the point of working with the application developed or existing applications that are integrated using software integration to communicate to the Thematic Engine 201 and/or QIE(OS) engine 203.

Thus, in one embodiment, the user is exposed to a virtual street view of a city signifying the actual location or Zone, and is able to enter any virtual store of an actual store, displaying only the merchandise requested by the user by designer/maker, size, color, and any other attributes selected or requested by the user to view and purchase goods.

In one embodiment, the user can create an avatar of themselves by exposing their image to an image capturing device 520 or set of devices (i.e., sensors) embedded either in a digital closet, mirror, stand, store, screen, or any other area that the image capturing device is located and can be activated. or any other area that the image capturing device 520 is located and can be activated. The QIE(OS) module 203 calculates the size of the avatar as the image capturing device 520 and/or devices scans the user's body to calculate their measurements directly by submitting the information through the Thematic Engine module 201, Digital Content library module 270, or directly to the QIE(OS) engine module 203 for processing. The measurement information is sent by the program 110 via a wireless connection to a storage device 205, such as a hard disk, mini disk, portable disk, or online inventory system 1200 or application, for further processing.

If an avatar is not used, in order to determine the size of the person who is purchasing the goods, or for another individual, the user is photographed, video-taped, or screened by an image capturing device 520 to obtain the measurements of the user/individual from all angles using algorithms, calculations, and/or mapping etc., which determine the individual's size. The individual could be using an image capturing mirror, screen, camera, video camera, image capturing device, cell phone or other device 104/520 that captures images. The image can be converted by the QIE(OS) module 203 into a real-life avatar, or an existing avatar on the system can be invoked, and will be mapped with the user's measurements. The QIE(OS) module 203 stores the data in a storage device 205 or location that is either in a dedicated computer system 101, in a disk drive, on the internet, or wherever the individual chooses to save the image for future use, or can transfer, teleport, email, or text the file to a store of choice, individual, or company. Captured images are converted by the QIE(OS) 203 of the present invention, in an application environment, and catalogued into a data storage 205, 114, content management system or a library, or other type of environment for future use. The user may also enter their measurements into an application either via voice, text, touch or some method of selection and save the information in a storage device 205, 114 for further use.

In one embodiment, in the virtual environment or metaverse provided by the program 110 (i.e., QIE(OS) module 203, Thematic Engine module 201, Digital Content Library module 270, etc.), the user can be provided with a hologram of themselves by the program 110 based on the measurements from the imaging capturing device 520, and the QIE(OS) module 203 can map the merchandise over the hologram of the user to obtain correct sizing of the merchandise for purchase, or when finding merchandise. To accomplish this transfer/conversion, a holographic representation of the person is projected by the program 110 (i.e., GUI module 200) by selecting the hologram version of themselves from an input device 104, hand held device, wand type of device, command (either voice or typed), brain/mind control system, eyeglass, watch, virtual closet, or some other device etc., used to make this selection. The QIE(OS) module 203 will access the images of the stored merchandise and rasterize the clothing into a holographic form to be mapped over the holographic image of the user. The measurements and size of the hologram will match that of the individual to obtain the correct merchandise size. The images of the merchandise taken from either the inventory section of the store and/or storage area, are sent to the QIE(OS) engine 203 for further processing, and sent by the program 110 to the appropriate display 102 for the user review.

In one embodiment the user searches the data storage 205 or Digital Content Library module 270 by the QIE(OS) module 203 and matches clothing using the measurements calculated for the avatar or hologram and locates merchandise containing the calculated measurements that were captured and stored by the QIE(OS) module 203 in each piece of merchandise from the manufacturing process to inventory.

In one embodiment, the user may capture their image using an image capturing device 520 and obtain their measurements at that moment in time, and map those measurements by the QIE(OS) module 203 to clothing in their personal closet(s), drawer(s), at home etc. For example, the individual's body may swell throughout the day and certain clothes will not fit properly. The user may send a request to the program 110 of the inventory system 800 to search their closet, or their virtual closet (if uploaded into storage 205), and request a catalog of images with their location (i.e., particular drawers, closets, etc.), to determine what will fit appropriately on that given day. This is accomplished via the input device 104, phone, tablet, PDA, etc., using the QIE(OS) module 203, the Thematic Engine module 201 via the input device. The information on the items found by the program 110 is sent to the thematic environment 201 requesting a search through a local data storage 205 of the individual's closet and all the goods, merchandise, footwear etc. that is in the closet, presenting the images back to the user on the display 102 with a GPS or other technology location signal, information.

In one embodiment, the user may send their captured image measurements, or avatar (via the QIE(OS) module 203 and Thematic Engine module 201), to a designer or manufacturer to create a specific pattern with their exact measurements for "clothing on demand", "goods on demand", "merchandise on demand", "footwear on demand" etc. A digital copy with the user's measurements, avatar with measurements, and/or all measurements that have been mapped by the image capturing device 520 or the actual mapped measurements, can be sent by the program 110 (i.e., QIE(OS) module 203 and Thematic Engine module 201) directly to the designer/manufacturer to develop a pattern that is sent back to the individual for approval, and payment via the billing and accounting functions of the engine 202, through an application, text, video email, social network or other method. Upon approval, the pattern is cut, sewn/manufactured/produced and marked with an ID/code specific to that individual (and may be uploaded into the user's personal inventory system). The merchandise is then shipped to the individual, with the tracking and monitoring function of the inventory system 1200 keeping track of the item.

In one embodiment, the present invention uses a conversion-type software program 110 to convert the image to mesh type line art covering the avatar or hologram, and uploading the information to the thematic application environment (i.e., Thematic Engine 201), the QIE(OS) engine 203, 3D CAD for patterns, design, imaging, or other software application for processing. In one embodiment, the measurements are sent by the program 110 to manufacturing device, such as a blow molding device, sewing machine for "clothing on demand", or directly to a manufacturing plant equipment that processes large quantities at that particular size either via sewing machines or other devices depending upon the goods being manufactured.

In one embodiment, the digital closet, mirror, stand, store, screen, includes buttons which provide connection to an input device 104 or image capturing device 520. In one embodiment, the digital closet, screen, mirror, etc., includes a panel which provides buttons for access to computers and the internet, provides for voice activation, camera mode, video capture mode, input capture mode, access to a store, to a mall, to a street view, and to TV.

In one embodiment, the user is exposed to a personal (online) catalog of merchandise specifically populated with inventory suitable for the user by the QIE(OS) module 203 and the AI engine module 257, for view and purchase. In one embodiment, the user is presented with a personal catalog of the goods requested, or selected by the user or a consultant, or AI application, for viewing and purchasing of goods. The catalog would be provided as a user-designed online/virtual store specifically populated with inventory suitable for the user (or requested by the user), based on the user's specifications, or a store or business that has a current location in the physical world displaying the current real-life inventory. The user's merchandise selection process can be conducted via user voice-activated commands, user entering/inputting selection criteria into a digital input device 104, by motion control, brain/mind control activation, and other type of interactive selection processes.

In one embodiment, the user is allowed access to the inventory management system 800 for real-time location of merchandise. In one embodiment, the user can log into the inventory system 800 from a computer, cell phone, tablet, or other electronic input device 104 or image scanning or capturing system 520, can map the user's measurements using a real-time image of the user onto merchandise from a closet of the user, or by using the user's calculated measurements, or measurements calculated for the user's avatar, and search for goods, merchandise etc. that fit the user. This is carried out by the user inputting their specifications/measurements, designer/maker, color, price etc., into the inventory system 800 to locate and match merchandise therein, containing the calculated measurements that were captured and stored from the manufacturing process.

In one embodiment the user can use voice commands, written commands, touch screen or other type of intelligent sensory activity, including brain interface/mind control, to instruct or activate the equipment 104, 800 for purposes of finding the goods by vendor, size, color, shape, specification, price, location, etc. The images accessed from the storage device 205 may be in the form of 2D, 3D, 4D (non-augmented motion), 5D, video, or any other type of format required or searched. In one embodiment, the program 110 managing the inventory system 800 will send a signal to the store locator engine to locate the goods/merchandise via a GPS locator or other mechanisms as described above, and locate the goods for viewing and purchasing by the user. Depending upon the instructions provided by the user, the information regarding purchasing etc., will be processed through the thematic application (Thematic Engine module 201, Digital Content Library module 270), inventory system 800, and/or QIE(OS) engine 203.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A method of inventory management including sizing merchandise for a person, comprising:
measuring one or more parts of a body of the person, or an avatar of the body of the person, using a measuring device capable of sizing merchandise;
wherein the measuring device captures measurements of the person using one of an image capturing device, or an article of clothing worn by the person and capable of taking measurements;
analyzing the measurements using a controller which includes a quantum imaging environment (QIE) module, the controller which processes and formats the measurements;
transmitting the measurements using the controller to an enterprise resource planning system (ERP), a designer, or a store;
processing, rendering and merging the measurements with data from the merchandise using the controller to obtain sizing information of the person;
displaying as digital images on a display, the body of the person or the avatar of the body of the person, with the sized merchandise mapped thereon, allowing the person to try on the sized merchandise in a virtual environment; and
storing the measurements and sizing information in a data storage.

2. The method of claim 1, wherein the article of clothing includes but is not limited to a piece of footwear or foot covering, a piece of clothing that covers one of at least an upper body, a lower body, or extremities, and which molds to said body of said person.

3. The method of claim 2, wherein said article of clothing includes at least one of a conductive yarn, or a memory-based fiber that contains an identification including at least one of a specialty threaded sensor or thread, a label, a conductive ink, bar code, a fiber optic thread, or a programmable sensor.

4. The method of claim 3, wherein said article of clothing includes at least one of a stretchable or bendable battery, the controller containing said QIE (OS) module, or a temperature mechanism.

5. The method of claim 1, wherein said measuring device is a tube having at least one image capturing device disposed overhead on a rotating belt or track that takes an image of said person to obtain said measurements for sizing.

6. The method of claim 5, wherein said measuring system is a portable device containing the controller that implements said QIE module, and at least one of a Thematic Engine module, an AI module, or a Digital Content Library module.

7. The method of claim 1, wherein said measuring system is a portable device having the image capturing system connected via a rod or pole, which measures said body of said person as said person rotates and moves around said portable device.

8. The method of claim 1, wherein said image capturing device includes the controller containing said QIE module, and/or connects to at least one of a black box, an IPAD, or a computer, via a communication device.

9. The method of claim 1, wherein said measuring device is one of a scanner, a wand, a technical box, a command device, a brain/mind control system, an eyeglass, a watch, a virtual closer or a mirror having embedded image capturing devices, a digital screen, or a stand with one or more image capturing devices.

10. The method of claim 4, wherein said QIE module calculates and maintains in said data storage and/or a Digital Content Library module, all said measurements of said person.

11. The method of claim 10, further comprising:
embedding, using an embedding device instructed by said controller, said measurements into an identification including at least one of a specialty threaded sensor or thread, a label, a conductive ink, bar code, a fiber optic thread, or a programmable sensor, for one of sizing of said person, or security and/or tracking of said merchandise.

12. The method of claim 1, wherein said sizing of said person is conducted in at least one of the virtual environment or metaverse, the store, a business, or a social network, or from at least one of a virtual closet, a computer environment, or a cell phone.

13. The method of claim 12, wherein said merchandise is displayed as a plurality of digital images or data, in a real world, in a virtual world or a combination thereof, using a Graphical User Interface (GUI) module; and wherein said user is provided, using said QIE module, a Thematic Engine module and a Digital Content Library module, with a location or Zone of said merchandise or said store or a business, from a GPS or a satellite, and said location or Zone is a physical location of one of a rack in said store or said business, a shelf, a hangar, a case, a closet, or an address or location in a home.

14. The method of claim 13, wherein said user is provided with a hologram of said user from an input device, based on said measurements from said image capturing device, and said QIE module maps said merchandise over said hologram of said user to locate and/or obtain a size of said merchandise, and displays said sized merchandise to said user on a display device.

15. The method of claim 1, wherein the image capturing device includes one of a wand, sewing machine, cutting device, blow molding device, or embedding device.

16. The method of claim 1, wherein measurements are mapped to an existing avatar stored in an inventory system or an avatar with those measurements is created.

17. The method of claim 1, wherein the digital images of the sized merchandise are retrieved from a catalog of images of clothing from a data storage of the user.

18. The method of claim 1, wherein the controller forwards the sizing information to a designer or manufacturer to create a pattern with the measurements for the merchandise.

* * * * *